US012297345B2

(12) United States Patent
Ayyakkalai et al.

(10) Patent No.: US 12,297,345 B2
(45) Date of Patent: May 13, 2025

(54) COMPOSITE, PROCESS FOR PREPARING THE COMPOSITE, AND IMPLEMENTATION THEREOF

(71) Applicant: SEA6 Energy PVT. LTD, Bangalore (IN)

(72) Inventors: Balamurugan Ayyakkalai, Bangalore (IN); Hemanth Giri Rao Vantharam Venkata, Bangalore (IN); Sri Sailaja Nori, Bangalore (IN); Shrikumar Suryanarayan, Bangalore (IN); Praneeth Srivanth Ramesh, Bangalore (IN)

(73) Assignee: SEA6 ENERGY PVT. LTD, Bangalore (IN)

( * ) Notice: Subject to any disclaimer, the term of this patent is extended or adjusted under 35 U.S.C. 154(b) by 0 days.

(21) Appl. No.: 17/699,659

(22) Filed: Mar. 21, 2022

(65) Prior Publication Data

US 2022/0204730 A1 Jun. 30, 2022

Related U.S. Application Data

(63) Continuation of application No. PCT/IN2021/050288, filed on Mar. 19, 2021.

(51) Int. Cl.
| | | |
|---|---|---|
| *C08K 5/17* | (2006.01) | |
| *C08K 5/00* | (2006.01) | |
| *C08K 5/053* | (2006.01) | |
| *C08K 5/19* | (2006.01) | |
| *C08K 5/42* | (2006.01) | |
| *C08L 5/00* | (2006.01) | |
| *C08L 5/04* | (2006.01) | |

(52) U.S. Cl.
CPC ............... *C08L 5/00* (2013.01); *C08K 5/053* (2013.01); *C08K 5/17* (2013.01); *C08K 5/19* (2013.01); *C08K 5/42* (2013.01); *C08L 5/04* (2013.01); *C08L 2201/06* (2013.01); *C08L 2201/10* (2013.01); *C08L 2203/16* (2013.01)

(58) Field of Classification Search
CPC . C08K 5/00; C08K 5/053; C08K 5/42; C08K 5/04; C08K 5/17; C08K 5/19
See application file for complete search history.

(56) References Cited

U.S. PATENT DOCUMENTS

| | | |
|---|---|---|
| H2050 H | 10/2002 | Santos et al. |
| 7,235,594 B2 | 6/2007 | Han et al. |
| 9,556,328 B2 | 1/2017 | Meena et al. |
| 2003/0114427 A1* | 6/2003 | Yuki ..................... A61P 43/00 514/553 |
| 2012/0122997 A1* | 5/2012 | Abbott .................... C08L 5/12 426/573 |
| 2014/0194289 A1* | 7/2014 | Sclapari ................ A01N 33/12 504/303 |
| 2015/0274942 A1 | 10/2015 | Meena et al. |
| 2016/0324755 A1 | 11/2016 | Jeong et al. |
| 2017/0342346 A1* | 11/2017 | Zhang ..................... C08L 1/08 |

FOREIGN PATENT DOCUMENTS

| | | | |
|---|---|---|---|
| CA | 2654771 C | | 1/2007 |
| CA | 2953586 A1 | | 7/2018 |
| CN | 10239200 A | * | 1/2012 |
| CN | 103301047 A | * | 9/2013 |
| CN | 104910429 A | | 9/2015 |
| CN | 106948214 A | * | 7/2017 |
| CN | 107692225 A | | 2/2018 |
| CN | 107840705 A | * | 3/2018 |
| WO | 2009/045022 A2 | | 4/2009 |
| WO | 2010/052703 A1 | | 5/2010 |
| WO | 2013/173434 A1 | | 11/2013 |
| WO | WO-2017204617 A1 | * | 11/2017 ............. A61K 36/02 |

OTHER PUBLICATIONS

The machine translation into English of CN-10239200-A; Dong et al; Jan. 2012 (Year: 2012).*
The machine translation into English of CN-103301047-A; Zhang (Year: Sep. 2013).*
Machine translation into English of Niu et al; CN-107840705-A (Year: 2018).*
Machine translation into English of Li; CN-106948214-A (Year: 2017).*
T. Karbowiak et al., "Wetting Properties at the Surface of Iota-Carrageenan-Based Edible Films", Journal of Colloid and Interface Science, 2006, vol. 294, pp. 400-410.
S. Wang et al., "Choline Chloride/Urea as an Effective Plasticizer for Production of Cellulose Films", Carbohydrate Polymers, 2015, vol. 117, pp. 133-139.
J. A. Sirvio, "Effect of Plasticizers on the Mechanical and Thermomechanical Properties of Properties of Cellulos-Based Biocomposite Films", Industrial Crops & Products, 2018, vol. 122, pp. 513-521.
T. I.A. Gouveia et al., "A New Approach to Develop Biodegradable Films based on Thermoplastic Pectin", Food Hydrocolloids, 2019, vol. 97, 10 pages.

(Continued)

*Primary Examiner* — Karuna P Reddy
(74) *Attorney, Agent, or Firm* — BakerHostetler

(57) ABSTRACT

The present disclosure discloses a composite comprising: (a) at least one seaweed or seaweed extract; and (b) at least one ammonium salt, wherein the ammonium salt is an organic ammonium salt. The composite further comprises at least one component selected from the group consisting of an oleophilic component, and an amphiphilic component, A process for preparing the composite is also disclosed herein. The composite is further molded into various articles as disclosed herein.

21 Claims, 5 Drawing Sheets

(56) References Cited

OTHER PUBLICATIONS

Figure 1:
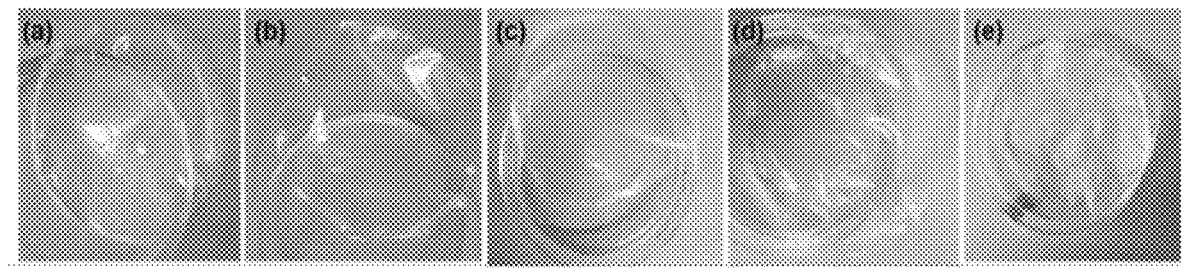

S. Roy et al., "Preparation of Carrageenan-Based Functional Nanocomposite Films Incorporated with Melanin Nanoparticles", Colloids and Surfaces B: Biointerfaces, 2019, vol. 176, pp. 317-324.
J. P. Chaudhary et al., "Seaweed-Derived Polymeric Materials for Multiapplications Including Marine Algal Cultivation", Royal Society of Chemistry, RSC Advance, 2015, vol. 5, pp. 19426-19431.
E. Leroy et al., "Deep Eutectic Solvents as Functional Additives for Starch Based Plastics", Green Chem., 2012, vol. 14, pp. 3063-3066.
Sun Jie; "Basics and applications of surfactants"; Dalian University of Technology Press; 1992; p. 7 (contains English Translation).

* cited by examiner

COMPOSITE, PROCESS FOR PREPARING THE COMPOSITE, AND IMPLEMENTATION THEREOF

CROSS REFERENCE TO RELATED APPLICATIONS

This application is a Continuation Application of International Patent Application No. PCT/IN2021/050288, filed Mar. 19, 2021, which claims priority to Indian Patent Application number 202041011997 filed Mar. 19, 2020, the disclosures of which are incorporated by reference in their entirety.

FIELD OF INVENTION

The present disclosure broadly relates to the field of plastic management. In particular, the present disclosure relates to the biodegradable composite. The present disclosure also discloses a process for preparing the biodegradable composite, and implementations thereof.

BACKGROUND OF INVENTION

Plastic pollution has become one of the biggest threats to our planet that adversely affects the natural environment and creates problems for plants, wildlife, and even the human population. Importantly, microplastics are considered as one of the most dangerous elements of plastic pollution, which is pollution due to microscopic particles of partially degraded plastics. The microplastics can enter the bodies of humans and animals via drinking water or by eating seafood and can cause health problems, including death, There have been various attempts introduced to minimize plastic use in recent years.

One of the attempts to address the current plastic pollution is the development of alternative plastic materials that are environment-friendly and biodegradable, that decompose naturally in the environment. It is also expected that these materials could significantly substitute or complement conventional petroleum-based synthetic plastic materials in the future. Biodegradable materials are produced from raw materials such as corn, sugarcane, vegetable oil, and starch. These biodegradable materials are reported in various prior arts. For instance, CA2654771C discloses a composition comprising: a matrix comprising a foamed gelling system; a fibrous material embedded in said matrix; and a firming agent embedded in said matrix.

U.S. Pat. No. 7,235,594B2 discloses a biodegradable composition comprising 100 parts by weight of polyolefin matrix resin; and 5 to 400 parts by weight of grain powder selected from the group consisting of rice powder, corn powder and mixture thereof.

However, the production of the bioplastic materials using these raw materials has raised some concerns as follows: (i) the production of the raw materials requires a huge investment in fertile land, fertilizers, agro-chemicals, freshwater, etc.; (ii) use of these plant-based raw materials will accelerate the deficiency in the food usage which could create a food crisis because of the competition between the plants for plastic materials versus plants for food.

Accordingly, there is a dire need in the art to provide a natural, non-toxic, environment-friendly, and biodegradable composite that is prepared from green, robust process and that would help in curbing pollution.

SUMMARY OF THE INVENTION

In an aspect of the present disclosure, there is provided a composite comprising: (a) at least one seaweed or seaweed extracts; and (b) at least one ammonium salt, wherein the ammonium salt is an organic ammonium salt.

In another aspect of the present disclosure, there is provided a composite comprising: (a) at least one seaweed or seaweed extracts; (h) at least one ammonium salt; and (c) at least one oleophilic component, wherein the ammonium salt is an organic ammonium salt.

In another aspect of the present disclosure, there is provided a composite comprising: (a) at least one seaweed or seaweed extracts; (h) at least one ammonium salt; and (b) at least one amphiphilic component, wherein the ammonium salt is an organic ammonium salt.

In another aspect of the present disclosure, there is provided a process for preparing a composite comprising: (a) at least one seaweed or seaweed extracts; and (b) at least one ammonium salt, wherein the ammonium salt is an organic ammonium salt, said process comprising: (i) obtaining at least one seaweed or seaweed extract; (ii) contacting and heating the seaweed or seaweed extract in at least one solvent to obtain a preheated mixture; (iii) contacting the preheated mixture and at least one ammonium salt to obtain a first mixture, wherein the ammonium salt is an organic ammonium salt; and (iv) evaporation the solvent from the first mixture to obtain the composite, wherein the composite is in the form selected from the group consisting of dry granules, wet pulps, dry powder, dry flakes, capsules, and wet pastes, and wherein the composite is biodegradable.

In another aspect of the present disclosure, there is provided a composite comprising: (a) at least one seaweed or seaweed extracts; (b) at least one ammonium salt; and (c) at least one oleophilic component, wherein the ammonium salt is an organic ammonium salt, said process comprising: (i) obtaining at least one seaweed or seaweed extract; (ii) contacting and heating the one seaweed or seaweed extract in at least one solvent to obtain a preheated mixture; (iii) contacting the preheated mixture and at least one ammonium salt, and at least: one oleophilic component to obtain a first mixture, wherein the ammonium salt is an organic ammonium salt; and (iv) evaporating the solvent from the first mixture to obtain the composite, wherein the composite is in the form selected from the group consisting of dry granules, wet pulps, dry powder, dry flakes, capsules, and wet pastes, and wherein the composite is biodegradable.

In another aspect of the present disclosure, there is provided a process for preparing a composite comprising: (a) at least one seaweed or seaweed extracts; (b) at least one ammonium salt; and (b) at least one amphiphilic component, wherein the ammonium salt is an organic ammonium salt, said process comprising: (i) obtaining at least one seaweed or seaweed extract; (ii) contacting and heating the one seaweed or seaweed extract in at least one solvent to obtain a preheated mixture; (iii) contacting the preheated mixture and at least one ammonium salt, and at least one amphiphilic component to obtain a first mixture, wherein the ammonium salt is an organic ammonium salt; and (iv) evaporating the solvent from the first mixture to obtain the composite, wherein the composite is in the form selected from the group consisting of dry granules, wet pulps, dry powder, dry flakes, capsules, and wet pastes, and wherein the composite is biodegradable.

In another aspect of the present disclosure there is provided an article comprising the composite as disclosed herein, wherein the composite is in the form selected from the group consisting dry granules, wet pulps, dry powder, dry flakes, capsules, and wet pastes, and wherein the composite is biodegradable.

In another aspect of the present disclosure, there is provided a process for preparing the article as described herein, said process comprising: (i) obtaining at least one seaweed or seaweed extract; (ii) contacting and heating the seaweed or seaweed extract in at least one solvent to obtain a preheated mixture; (iii) contacting the preheated mixture and at least one ammonium salt to obtain a first mixture, wherein the ammonium salt is an organic ammonium salt; (iv) transferring the first mixture into a mold or an extruder to obtain a molded composite; and (v) evaporating the solvent from the molded composite to obtain the article.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF ACCOMPANYING DRAWINGS

The following drawings form a part of the present specification and are included to further illustrate aspects of the present disclosure. The disclosure may be better understood by reference to the drawings in combination with the detailed description of the specific embodiments presented herein.

Figure 2:
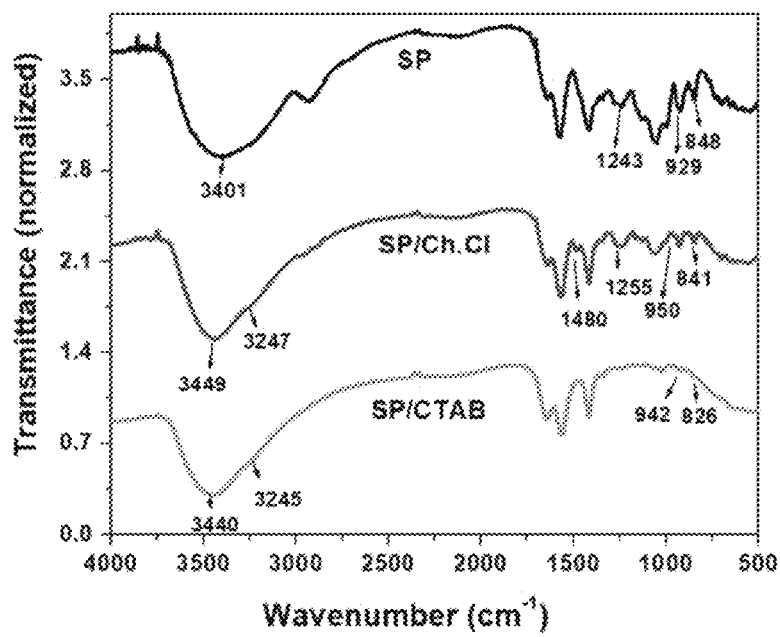

FIG. 1 depicts the seaweed polysaccharide (SP) based aquaphohic composite material, in accordance with an embodiment of the present disclosure. FIG. 1(a) depicts FIG. 1(a) depicts choline chloride incorporated seaweed polysaccharide (SP+Ch.Cl) or composite 2; FIG. 1(b) depicts tris(hydroxymethyl)aminomethane (TRIS) incorporated seaweed composite film (SP±TRIS or composite 3); FIG. 1(c) depicts the choline chloride, glycerol and SDS mixture incorporated seaweed polysaccharide composite film (SP+SDS+Ch.Cl+Gly or composite 5; and FIG. 1(d) depicts the choline chloride, palm oil and cetyl trimethyl ammonium bromide (CTAB) incorporated seaweed composite film (SP+CTAB+Ch.Cl+PO) or Composite 6; FIG. 1(e) depicts the CTAB and SPAN 80 incorporated seaweed composite film (SP+CTAB+Span 80 or composite 7), FIG. 2 depicts the FTIR spectra, in accordance with an embodiment of the present disclosure.

Figure 3:
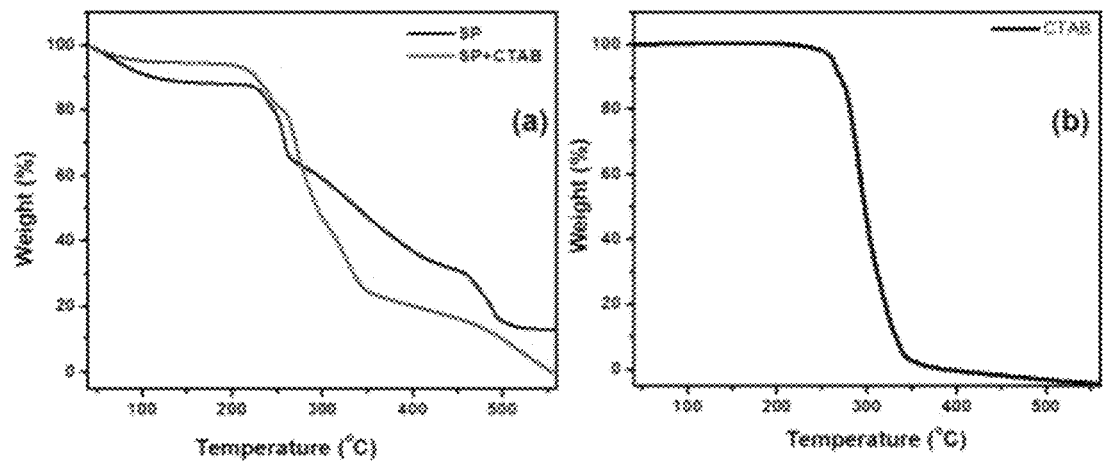

FIG. 3 depicts the Thermogravimetric analysis (TGA) data of (a) the seaweed polysaccharide (SP, Ex-2), and SP+CTAB composite material (similar to Composite 17 of Example 18); (b) CTAB, in accordance with an embodiment of the present disclosure.

Figure 4:
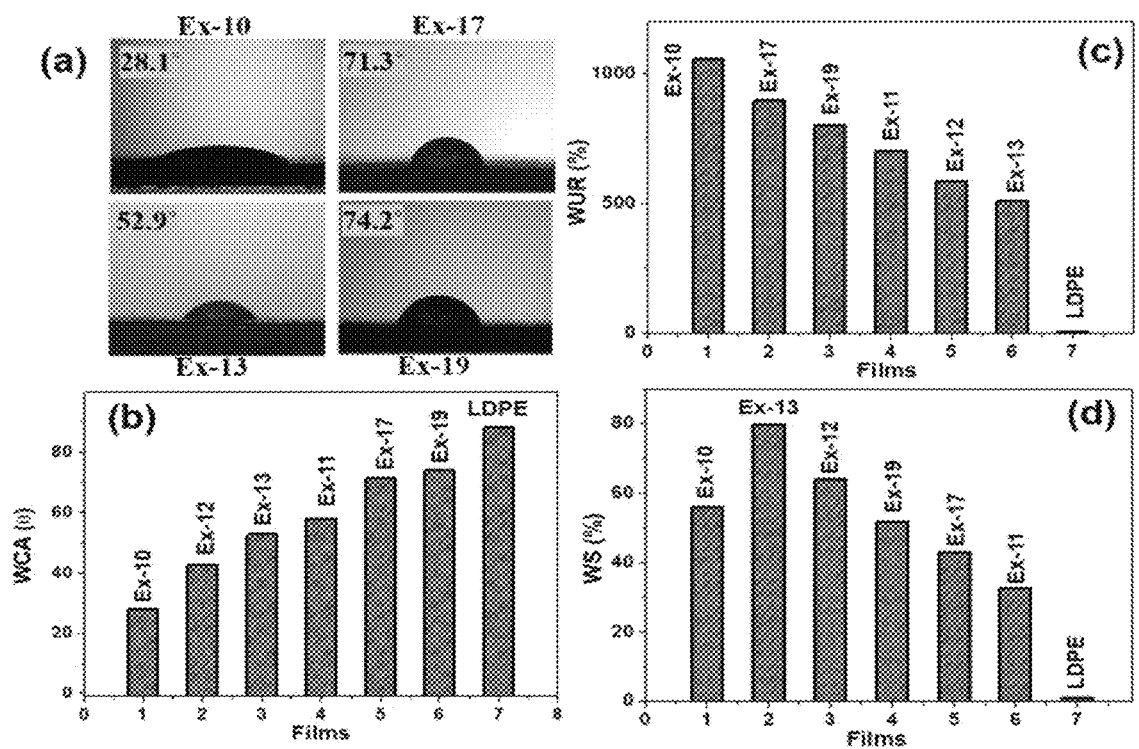

FIG. 4 depicts the aquaphobicity of the composite films prepared with incorporation of various ammonium salts in dry kappaphycus seaweed fiber (DSF), and the tunability of the aquaphobicity b varying the composition of the composite, in accordance with an embodiment of the present disclosure. FIG. 4(a) depicts the pictorial representation of the water contact angle; FIG. 4(b) depicts a comparison of the water contact angle; FIG. 4(c) depicts a comparison of the water uptake ratio (WUR), and FIG. 4(d) depicts a comparison of the water solubility (WS) for various composite films.

Figure 5:
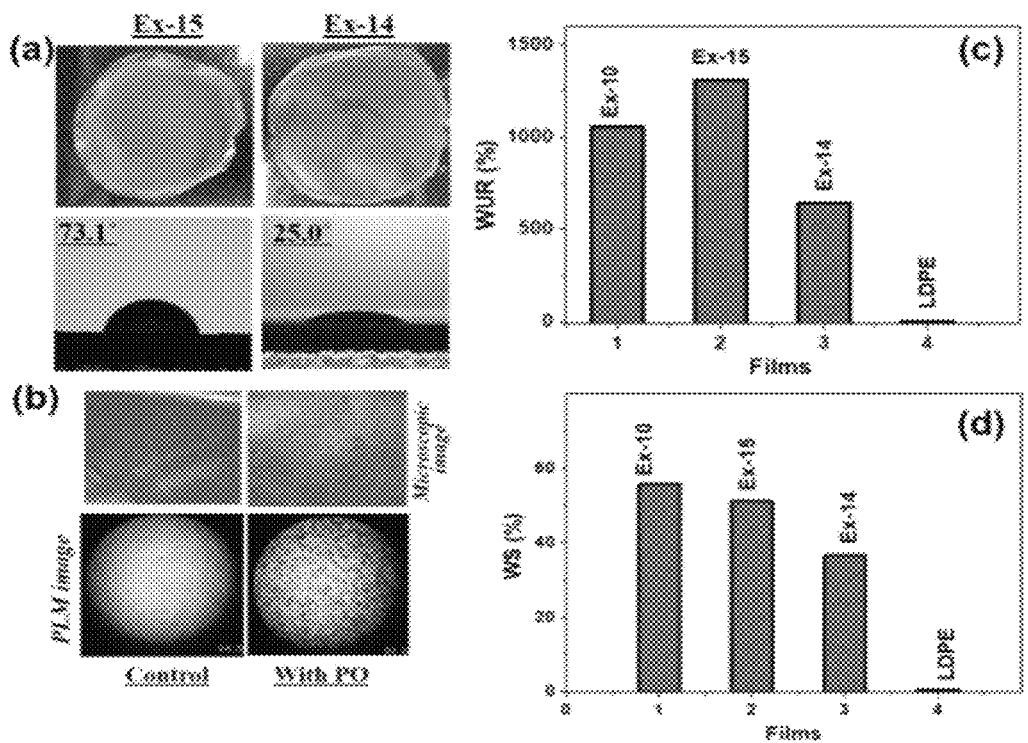

FIG. 5 depicts the enhancement of aquaphobicity of the composite films prepared by incorporating oleophilic component along with ammonium salts M dry kappaphycus seaweed fiber (DSF), era accordance with in embodiment of the present disclosure, FIG. 5(a) depicts the pictorial representation of the water contact angle; FIG. 5(b) depicts a comparison of the water contact angle; FIG. 5(c) depicts a comparison of the water uptake ratio (WUR), and FIG. 5(d) depicts a comparison of the water solubility (WS) for various composite films.

Figure 6:
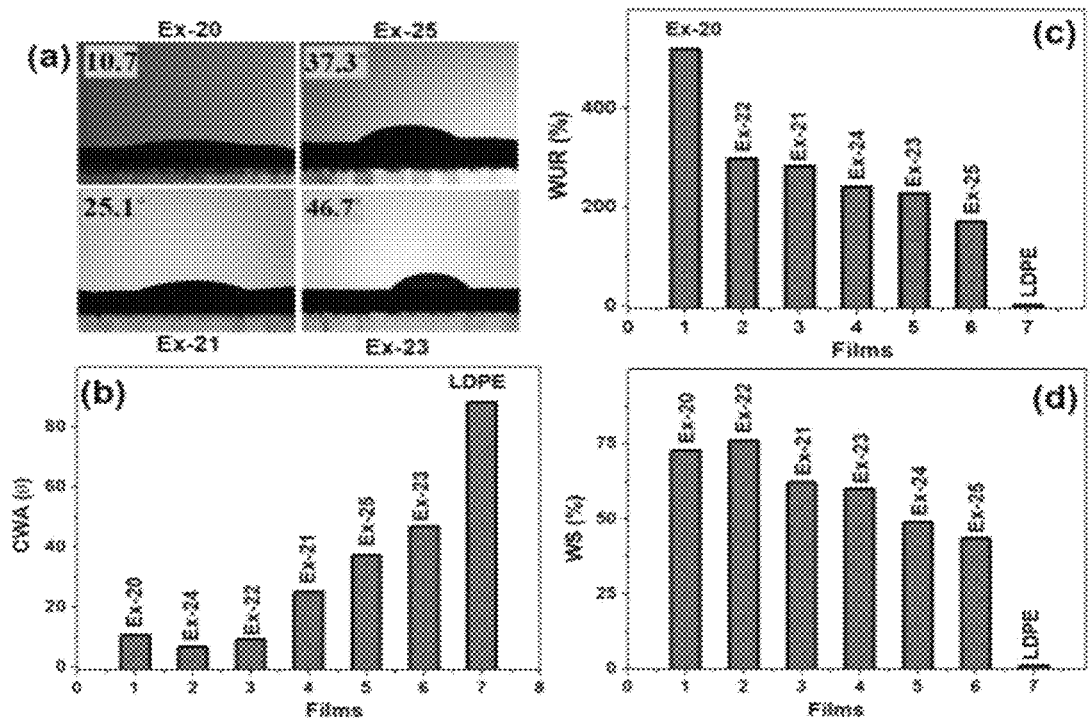

FIG. 6 depicts the evaluation of aquaphobicity of the various composite films prepared by incorporation of various ammonium salts, and/or oleophilic components and/or amphiphilic components in dry spinosum seaweed fiber (sp-DSF) accordance with an embodiment of the present disclosure. FIG. 6(a) depicts the pictorial representation of the water contact angle; FIG. 6(b) depicts a comparison of the water contact angle; FIG. 6(c) depicts a comparison of the water uptake ratio (WUR), and FIG. 6(d) depicts a comparison of the water solubility (WS) for various composite films.

Figure 7:
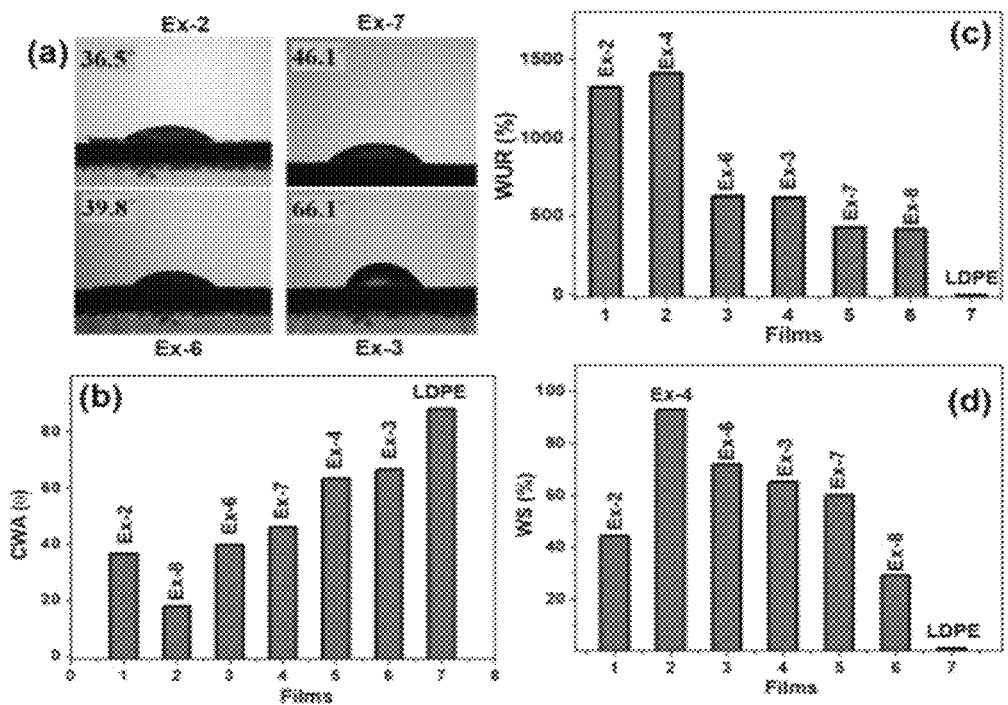

FIG. 7 depicts the evaluation of aquaphobicity of the composite films by incorporation of various ammonium salts, and/or oleophilic components and/or amphiphilic components in extracted seaweed polysaccharide (SP), in accordance with an embodiment of the present disclosure. FIG. 7(a) depicts the pictorial representation of the water contact angle; FIG. 7(b) depicts a comparison of the water contact angle, FIG. 7(c) depicts a comparison of the water uptake ratio (WUR), and FIG. 7(d) depicts a comparison of the water solubility. (WS) tor various composite films.

Figure 8:
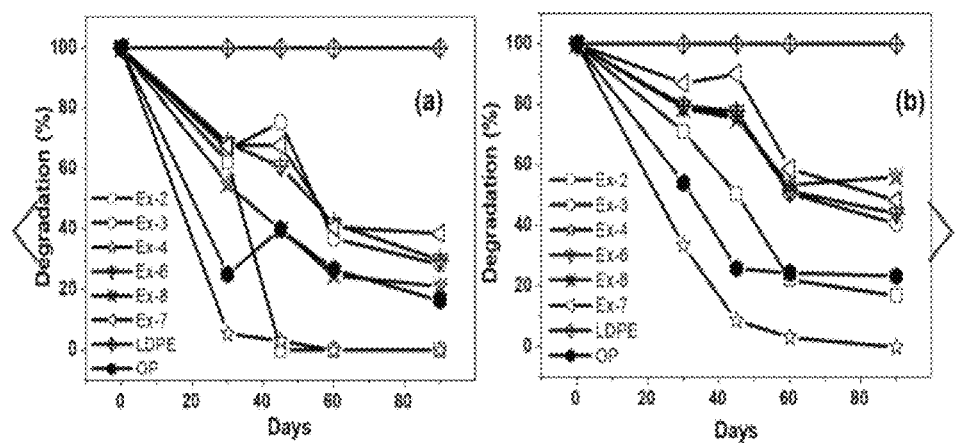

FIG. 8 depicts the biodegradation of profiles for extracted seaweed polysaccharide (SP) based composite films with incorporation of ammonium salts, and/or oleophilic components, author amphiphilic components, in accordance with an embodiment of the present disclosure. FIG. 8(a) depicts the biodegradation of the films after buying them inside garden soil and FIG. 8(b) depicts the biodegradation of the films after placing them on the surface oldie garden soil.

Figure 9:
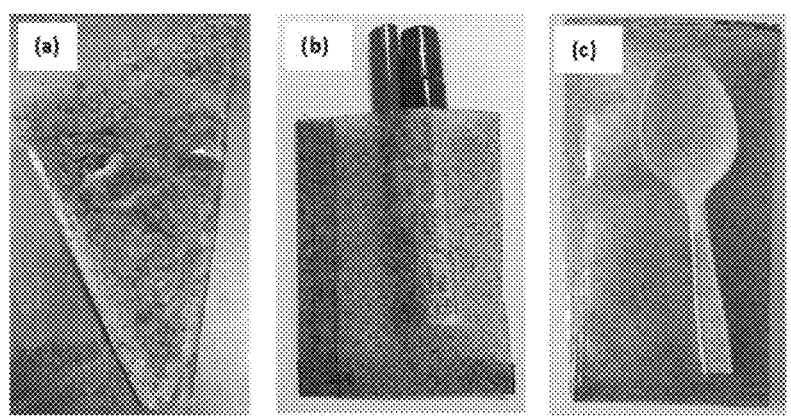

FIG. 9 depicts some of the applications of the biodegradable composite which include (a) a sandwich food wrap, (b) a pouch, (c) a heat sealable sachet, in accordance with an embodiment of the present disclosure.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, or convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

As disclosed herein, the term "composite' refers to products made from two or more different components and it provides a designed solution that surpasses the performance of the starting materials. The term "biodegradable" refers to the materials or substances capable of being decomposed or breakdown by microorganisms, such as bacteria or other living organisms and thereby avoiding is pollution.

For the purposes of the present disclosure, the term "seaweed' refers to either wet seaweed harvested directly from its natural marine environment or habitat, or seaweed that has been dried after harvesting from its natural marine environment or habitat. The natural environment or habitat may accordingly be selected from a group comprising but not limiting to water bodies such as ocean and sea. The seaweed and fresh seaweed are used interchangeably throughout the disclosure. The seaweed as used herein is intended to include, but not limited to *Kappaphycus striatus, Kucheuma cottonii, Eucheuma denticulatum* (spinosum) *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp. *Gigartina skottsbergii, Gelidium amansii, Gracilaria dura, Gracilaria gigas, Furcellaria* sp., *Sargassum* sp., *Ascophyllum* sp, *Kelp, Saccharina* sp., *Laminaria* sp., *Asparagopsis* sp., and *Ulva* sp.

The term "seaweed extract" refers to the diverse fractions that are extracted, harvested, and processed from the fresh seaweed. For example, one of the seaweed extracts can be the dried form of the seaweed pulp, which has been obtained by shredding the seaweed using a size reduction process. Therefore, the term seaweed extract is intended to include, but not limited to, polysaccharides. The term "polysaccharides" refers to carbohydrate molecules, specifically polymeric carbohydrates composed of monosaccharide units (sugar) bound together by glycosidic linkages. This carbohydrate can react with water in presence of enzymes, such as amylases resulting in constituent sugars. The polysaccharides derived from seaweed may have additional moieties such as sulfate groups, carboxylic acid groups, etc., which may occur naturally on the monosaccharide units. The term polysaccharides derived from seaweed is intended to include, but not limited to kappa-carrageenan, iota-carrageenan, lambda-carrageenan alginate, agar, ulvan, and combinations thereof. In the present disclosure, the terms "Seaweed Polysaccharides" or "SP" are the interchangeably used for seaweed or seaweed extracts or its derivatives.

The term "oleophilic" component refers to a substance that has an affinity for oils and not for water. Oleophilic component is a non-polar compound that shows more affinity towards the oils and non-polar substances. These include but are not limited to palm oil, vegetable oils, essential oils, lipids, and fatty acid esters.

The term "organic ammonium salts" refers to amine-based compounds with positively charged polyatomic ion. Organic ammonium salts can be classified into three types—primary, secondary, and tertiary with chemical formula of the cation as $NRH_3^+$, $NR2H_2^+$, $NR3H^+$, and $NR_4^+$ respectively, and can also be mono-, di-, tri- and polyamines in nature which includes but is not limited to tristhydroxymethyl)aminomethane (TRIS), cetyl trimethyl ammonium bromide (CTAB), cetyltrimethylammonium chloride (CTAC) quaternary ammonium salt of piperazine-N,N'-bis (2-ethanesulfonic acid) (PIPES), quaternary ammonium salt of ethylenediaminetetraacetic acid (EDTA) quaternary ammonium salt of (4-(2-hydroxyethyl)-1-piperazineethanesulfonic acid) (HEPES), ethylenediamine and their derivatives (such as TEMED), (2-hydroxyethyl)trimethylammonium chloride (choline chloride), benzalkonium chloride and their derivatives, betaine and their derivatives, alkylamines, dialkylamines, glutamine, asparagine, arginine, lysine, histidine, polylysine, polyarginine, polyhistidine, polyethylenimine, polyethylamine, poly(diallyl dimethyl ammonium chloride), and derivatives thereof, and combinations thereof. In contrast, inorganic ammonium salts refer to salts with chemical formula of the cation as $NH_4^+$.

The term "amphiphilic" component refers to molecules or substances that have both polar and non-polar parts. Amphiphilic compounds are either can be ionic or non-ionic in nature, such as sorbitol esters, polysorbates (SPAN-20-80, tween 20-80), sodium dodecyl sulfate (SDS), sodium octyl sulfate (SOS), sodium tetradecyl sulfate (STS) and fatty acids.

The term "aquaphobic" refers to the synonym of hydrophobic which literally means fear of water. Nonpolar molecules that repel the water molecules are said to be aquaphobic. The term "aquaphobic" and "aquaphobicity" are used interchangeably.

Aquaphobicity of the composite or of the constituent components is measured by (a) water contact angle, and/or (b) water uptake ratio, and/or (c) water solubility (described in Example 35). Aquaphobic composites have either higher water contact angle (especially above 65°), and/or lower water uptake ratio and/or lower water solubility with respect to the seaweed component.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

Unless defined otherwise, all technical and scientific terms herein have the same meaning as commonly understood by one of ordinary skill in the art to which this disclosure belongs, Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

As discussed in the background section of the present disclosure, owing to the shortcomings faced by the bioplastic, various efforts have been made to use ocean agriculture-based seaweed raw material. The use of seaweed has attracted much interest and attention because of its applications in the field of energy, food, tissue engineering, and biosensors, as well as drug delivery applications. Seaweed is also a green, abundantly available, renewable, and inexpensive source of polysaccharides and is mainly harvested from the sea. Most common seaweed-derived polysaccharides are alginates, carrageenans and agars, all of which are very hydrophilic in nature, but have interesting film forming properties. Carrageenans, are water-soluble polysaccharides extracted from the cell walls of red seaweeds (Rhodophyta), which have a structure comprising of a linear chain of sulfated galactans. Carrageenans are increasingly becoming a promising renewable biomaterial as it has a strong potential to replace conventional synthetic plastic materials. However, the use of these seaweed polysaccharides as plastic materials is still challenging because of their inherent limitations, such as hydrophilicity, brittleness, poor processability, poor moisture, and gas barrier properties, inferior compatibility, poor electrical, thermal and physical properties.

To overcome these limitations, considerable efforts have been attempted to improve the mechanical stability, flexibility and aquaphobicity for the last few decades. For instance, Kabriowiak et al. prepared the iota carrageenan based edible films with some additives such as glycerol used as a plasticizer, glycerol monostearate used as a surfactant, and fat which makes the film aquaphobic in nature (Karbowiak et al., Journal of Colloid and Interface Science, 294 (2006) 400-410). Similarly, there have been attempts to prepare edible biodegradable films based on cellulose, starch, pectin, chitosan in addition with plasticizers or deep eutectic solvents. However, the basic reactants are mainly agriculture-based raw materials which increases the production cost (Wang et al.; Carbohydrate Polymers 117 (2015) 133-139; Silvio et al.; Industrial Crops & Products 122 (2018) 513-521; Gouveia et al.; Food Hyd. 97 (2019) 105175). Roy et al. prepared the carrageenan-based nanocomposite films by incorporating the melamine nanoparticles that exhibited high thermal stability and mechanical stability along with the antibacterial activity. (Roy et al.; Colloids and Surfaces B: Biointerfaces 176; 2019, 317-324). Jeong et al. (US2016324755A1) showed that agar can b modified by adding hydrophobic alkyl chains and this is then mixed with an unmodified agar to prepare a gel with variable hydrophobicities by varying the relative amounts of the two. They demonstrated the increase in contact angle to demonstrate the increase in hydrophobicity. Meena et cd. (U.S. Pat. No. 9,556,328B2) and Chaudhary J P et al., (RSC Advances, 2015, 5, 19426) discloses that carrageenan can be used to prepare a hydrophobic biodegradable composite by chernically modifying it with vinyl acetate. Seaweed-based biodegradable composite has been prepared by using chemical modification with aquaphobic moieties, which enhances the aquaphobicity. However, these modifications were mainly carried out using hazardous chemicals like isocyanides or persulfates, etc., and sometimes under extreme reaction conditions, to obtain the target composite materials, wherein the chemicals used during the reaction are inherently toxic and may not be biodegradable and compostable. Since the production of bioplastic materials is envisaged on a very large scale of millions of tons, it is important that the production methods do not by themselves generate effluents that cause pollution. Further, any replacement for plastics or plant biomass-based bioplastics should be renewable, sustainable, have good mechanical, thermal, and aquaphobia properties. Aquaphobic properties improve the lifetime of use of the seaweed-based biodegradable composite materials to last the lifetime of use, which can vary from tens of minutes to several months. However, after this period, the extent of aquaphobicity is such that it allows for microbial action and facilitates biodegradation into non-toxic components in the soil or water. Therefore, there is an urgent need to provide the biodegradable composite that can solve the aforementioned problems.

The present disclosure provides a solution to the aforementioned problems in the form of a degradable and compostable composite based on natural seaweed raw material. The present disclosure envisages the use of biodegradable composite that further uses natural or biodegradable, non-toxic organic ammonium salts that react with the seaweed biomass by forming ionic, covalent and/or coordinate covalent interactions, and makes it compatible to obtain a homogeneous material. While it is expected that the properties of the organic ammonium salts for example, some organic ammonium salts such as benzalkonium chloride have anti-microbial and antiviral properties, are imparted onto the composite as well. Deep eutectic solvents (DES) comprising organic ammonium salt and a hydrogen bond donor (such as urea) have been used as plasticizers for making starch and agarose-based films (Leroy et al, Green Chem., 2012, 14, 3063, Shamsuri, A. S., Daik, R. (2012), *BioResources*, 7(4), 4760-4775). The presence of urea as a hydrogen bond donor is required with choline chloride, for proper film formation when using seaweed polysaccharides to make films.

Surprisingly and unexpectedly, in the present disclosure, the use of an organic ammonium salt, namely choline chloride, or any other cationic organic ammonium salt, in the absence of a hydrogen bond donor (such as urea), allows for the formation of good quality films with seaweed polysaccharides which are unexpectedly aquaphobic. Despite the strong hydrophilic nature of seaweed raw materials or their extracts, it is very surprising that adding cationic organic ammonium salts alone, increases the aquaphobicity markedly by at least one metric for measuring aquaphobicity even when some of these organic ammonium salts themselves are very water soluble and not aquaphobic by themselves. Therefore, surprisingly, the use of organic ammonium salt alone, or at a weight percentage in the range of 1-45% with respect to the composite is crucial for increase the aquaphobicity of seaweed based raw materials. The biodegradable composite further comprises the oleophilic component and/or amphiphilic components which by themselves are unable to impart the aquaphobicity to the seaweed component due to the contrasting hydrophilic nature of the seaweed raw material or its extracts. Therefore, in the present disclosure, the cationic organic ammonium salts that are added in the disclosed weight percentage range "allows" the oleophilic components to impart aquaphobicity character to the composite, which the oleophilic components are unable to do so in the absence of the ammonium salts. By varying the nature, chemical composition, molecular weight, functional groups, and amount of inclusion of the organic ammonium salts and/or oleophilic and/or amphiphilic compounds in the composite, the present disclosure provides a biodegradable composite with tunable aquaphobicity. Completely eliminating the ability of the composite to interact with water will not result in an environmentally friendly and biodegradable composite (such as plastics). Therefore, this property of tuning the aquaphobicity can be useful for using the biodegradable composite in applications requiring shorter usage lifetimes, such as straw which can have lower aquaphobicity, as compared to the packaging materials, for example.

The present disclosure also provides a method for detection of the composition wherein seaweed based extract along with organic ammonium salts have been prepared. FT-IR analysis (Example 43), or by using dyes such as new methylene blue and acridine orange that specifically detect the seaweed based extract and/or ammonium salt respectively, or even by chromatography, mass spectrometry and NMR based methods or even by proximate analysis (for example the carbon to nitrogen ratio), or a combination of the above methods, that can identify the molecular nature of the composition.

The present disclosure also discloses a process that uses green, robust, and mild conditions and water/water-acetone solvent system to prepare the biodegradable composite of the present disclosure.

Further, the biodegradable composite can be extruded into various shapes, blow-molded, injection-molded, stitched together, cast into shape, by different industrially available methods. These materials are observed to have excellent properties, including printability, opacity, or transparency as required, heat sealing, tolerance to both water-based materials and oil-based materials, mechanical strength, aquaphobicity, etc. The applications of these materials are not limited to films, bioplastic films, thermoformed inserts, sheets, sachets for both dry and wet materials, laminates, banners, loose fill for packaging, secondary packaging, bubble wrap, coatings, inner lining for cardboard boxes, multilayer films with at least one of the layers comprising the composite, blister packs, boxes, waste collection bags, shopping bags, bottles, trays, cups, lids, nettings, tubs for produce, pouches, jars, tunes, teabags, capsules, plates, straws, spoons, forks, food wraps, agricultural mulch films, plant pots, seed strips, twine, ties, clips, tapes, thread, gloves, masks, gowns, plastic replacement for electronics, automobile, aerospace, houseware, and textiles, and is envisaged as a wholesome replacement for fossil fuel-based plastics or bio-based plastics based on raw materials from land plants. In FIG. 9, examples of food wrap, pouch and a heat sealable sachet prepared from the biodegradable composite material are shown. Furthermore, the aquaphobicity and mechanical stability of the biodegradable composite offers an additional advantage of being easily degraded by the microbes that are important for circumventing the marine pollution. In addition, the articles disclosed herein can be advantageously used along with other non-biodegradable materials such as a multi-layer film in which one of the layers comprises the film from the composite disclosed herein, and other layers composed of non-biodegradable materials. This allows for increasing the overall percentage of the biodegradable materials in the melt-layer film.

The present disclosure relates to a biodegradable composite comprising: (a) is at least one seaweed or seaweed extracts; and (b) at least one ammonium salt. The biodegradable further comprises at least one component selected from the group consisting of at least one oleophilic component, at least one amphiphilic component, and combinations thereof. The present disclosure also discloses a process for preparing the composite. Further, the present disclosure discloses a bioplastic film and biodegradable article comprising the biodegradable composite.

In an embodiment of the present disclosure, there is provided a composite comprising: (a) at least one seaweed or seaweed extracts; and (b) at least one ammonium salt; wherein the ammonium salt is an organic ammonium salt.

In an embodiment of the present disclosure, there is provided a composite comprising: (a) at least one seaweed or seaweed extracts; (b) at least one ammonium salt; and (c) at least one component selected from the group consisting of an oleophilic component, and an amphiphilic component, wherein the ammonium salt is an organic ammonium salt.

In an embodiment of the present disclosure, there is provided as composite comprising: (a) at least one seaweed or seaweed extracts; (b) at least one ammonium salt; and (c) at least one oleophilic component, wherein the ammonium salt is an organic ammonium salt.

In an embodiment of the present disclosure, there is provided a composite comprising: (a) at least one seaweed or seaweed extracts; (b) at least one ammonium salt; and (c) at least one amphiphilic component, wherein the ammonium salt is an organic ammonium salt.

In an embodiment of the present disclosure, there is provided a composite as described herein, wherein the at least one seaweed or seaweed extracts to the at least one ammonium salt weight ratio is in a range of 1.2:1 to 53:1, In another embodiment of the present disclosure, the at least one seaweed or seaweed extracts to the at least one ammonium salt weight ratio is in a range of 1:3:1 to 49:1. In yet mother embodiment of the present disclosure, the at least one seaweed or seaweed extracts to the at least one ammonium salt weight ratio is in a range of to 2:1 to 34:1.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt, wherein the ammonium salt is an organic ammonium salt. In another embodiment of the present, disclosure, the at least one seaweed or seaweed extracts has a weight percentage in the range 43-98% with respect to the composite on a moisture free basis. In yet another embodiment of the present disclosure, the at least one seaweed or seaweed extracts has a weight percentage in the range of 55-95% with respect to the composite on a moisture free basis. In one another embodiment of the present disclosure, the at least one seaweed or seaweed extracts has a weight percentage in the range of 65-90% with respect to the composite on a moisture free basis. In an alternate embodiment of the present disclosure, the at least one seaweed or seaweed extracts has a weight percentage in the range of 70-85% with respect to the composite on a moisture free basis.

In an embodiment of the present disclosure, there is provided a composite comprising: (a) at least one seaweed or seaweed extracts; and (b) at least one ammonium salt having a weight percentage in the range of 2-45% with respect to the composite on a moisture-free basis, wherein the ammonium salt is an organic ammonium salt. In another embodiment of the present disclosure, the at least one ammonium salt has a weight percentage in the range of 2-30% with respect to the composite on a moisture-free basis. In yet another embodiment of the present disclosure, the at least one ammonium salt has a weight percentage in the range of 5-29% with respect to the composite on a moisture-free basis. In one another embodiment of the present disclosure, the at least one ammonium salt has a weight percentage in the range of 10-27% with respect to the composite on a moisture-free basis.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis, wherein the ammonium salt is an organic ammonium salt, and wherein the seaweed or seaweed extract to the ammonium salt weight ratio is in the range of 1.2:1 to 53:1.

In an embodiment of the present disclosure, there is, provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) at least one component selected from the group consisting of an oleophilic component having a weight percentage in the range of 5-15% with respect to the composite on a moisture free basis, and an amphiphilic component having a weight percentage in the range of 2-53% with respect to the composite on a moisture free basis, wherein the ammonium salt is an organic ammonium salt.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) at least one component selected from the group consisting of an oleophilic component having a weight percentage in the range of 5-15% with respect to the composite on a moisture free basis, and an amphiphilic component having a weight percentage in the range of 2-53% with respect to the composite on a moisture free basis, wherein the ammonium salt is an organic ammonium salt.

In an embodiment of the present disclosure, there is provided a composite comprising: (a) at least one seaweed or seaweed extracts; (b) at least one ammonium salt; and (c) at least one component selected from the group consisting of an oleophilic component having a weight percentage in the range of 5-15% with respect to the composite on a moisture free basis, and an amphiphilic component baying a weight percentage in the range of 2-53% with respect to the composite on a moisture free basis, wherein the ammonium salt is an organic ammonium salt, and wherein the seaweed or seaweed extract to the ammonium salt weight ratio is in the range of 1.2:1 to 53:1.

In an embodiment of the present disclosure, there is provided a composite comprising: (a) at least one seaweed or seaweed extracts; (b) at least one ammonium salt, and (c) at least one oleophilic component having a weight percentage in the range of 5-15% with respect to the composite on a moisture free basis, wherein the ammonium salt is an organic ammonium salt. In another embodiment of the present disclosure, the at least one oleophilic component has a weight percentage in the range of 5-12% with respect to the composite on a moisture free basis. In yet another embodiment of the present disclosure, the at least one oleophilic component has a weight percentage in the range of 6-10% with respect to the composite on a moisture free basis, in one another embodiment of the present disclosure, the at least one oleophilic component has a weight percentage in the range of 7-12% with respect to the composite on a moisture free basis.

In an embodiment of the present disclosure, there is provided a composite composing: (a) at least one seaweed or seaweed extracts; (b) at least one ammonium salt; and (c) at least one amphiphilic component having a weight percentage in the range of 2-53% with respect to the composite on a moisture free basis, wherein the ammonium salt is an organic ammonium salt. In another embodiment of the present disclosure, the at least one amphiphilic component having a weight percentage in the range of 10-45% with respect to the composite on a moisture free basis. In yet another embodiment of the present disclosure, the at least one amphiphilic component having a weight percentage in the range of 15-35% with respect to the composite on a moisture free basis.

In an embodiment of the present disclosure, there is provided a composite comprising (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) an oleophilic component having a weight percentage in the range of 5-15%, with respect to the composite on a moisture free basis, wherein the ammonium salt is an organic ammonium salt.

In an embodiment of the present disclosure, there is provided a composite comprising: (a) at least one seaweed or seaweed extracts having a weight percentage is in the range of 40-99% with respect to the composite on a moisture free basis; and (b) at least one ammonium salt having a weight percentage in the range of 1-45% with respect to the composite on a moisture-free basis; and (c) an oleophilic component having a weight percentage in the range of 5-15% with respect to the composite on a moisture free basis, and wherein the ammonium salt is an organic ammonium salt, and wherein the seaweed or seaweed extract to the ammonium salt weight ratio is in the range of 1.2:1 to 53:1.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) at least one amphiphilic component having a weight percentage in the range of 2-53% with respect to the composite on a moisture free basis, wherein the ammonium salt is an organic ammonium salt.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) at least one amphiphilic component having a weight percentage in the range of 2-53% with respect to the composite on a moisture free basis, wherein the ammonium salt is an organic ammonium salt, and wherein the seaweed or seaweed extract to the ammonium salt weight ratio is in the range of 1.2:1 to 53:1.

In an embodiment of the present disclosure, there is provided a composite comprising: (a) at least one seaweed or seaweed extracts; and (b) at least one ammonium salt, and wherein the ammonium salt is an organic ammonium salt, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sargassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and ulvan.

In an embodiment of the present disclosure, there is provided a composite comprising: (a) at least one seaweed or seaweed extracts; and (b) at least: one ammonium salt wherein the ammonium salt is an organic ammonium salt, and wherein the ammonium salt is selected from the group consisting of tristhydroxymethyl)aminomethane cetyl trimethyl ammonium bromide (CTAB) cetyltrimethylammoniumchloride (CTAC) quaternary ammonium salt: of piperazine-N,N'-bis(2-ethanesulfonic avid) (PIPES), quaternary ammonium salt of ethylenediaminetetraacetic acid (EDTA) quaternary ammonium salt of (4-(2-hydroxyethyl)-1-piperazineethariesulfonic acid) (HEPES), ethylenediamine derivatives (such as TEMED), (2-hydroxyethyptrimethylammonium chloride (choline chloride), benzalkonium chloride, betaine, alkylamines dialkylamine, glutamine, asparagine, arginine, lysine, histidine, polylysine, polyarginine, polyhistidine, polyethylenimine, polyethylamine, poly(diallyl dimethyl ammonium chloride), and derivatives thereof, and combinations thereof. In another embodiment of the present disclosure, the ammonium salt is tris(hydroxymethyl) aminomethane (TRIS), In yet another embodiment of the present disclosure, the ammonium salt is tetramethylethylenediamine (TEMED). In one another embodiment of the present disclosure, the ammonium salt is choline chloride. In an alternate embodiment of the present disclosure, the ammonium salt is dodecyltrimethylammonium bromide (CTAB). In a further embodiment of the present disclosure, the ammonium salt is polylysine.

In an embodiment of the present disclosure, there is provided a composite comprising: (a) at least one seaweed or seaweed extracts; and (b) at least one ammonium salt, wherein the ammonium salt is an organic ammonium salt, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp. *Sargassum* sp., *Ascophyllum* sp., *Kelp, Saccharina* sp., *Laminaria* sp., *Asparogopsis* sp., *Ulva* sp., kappa-carrageenan, iota-carrageenan, lambda-carrageenan, alginate, agar, and ulvan, and wherein the ammonium salt is selected from the group consisting of tris(hydroxymethyl) aminomethane (TRIS) cetyl trimethyl ammonium bromide (CTAB) cetyltrimethylammonium chloride (CTAC) quaternary ammonium salt of piperazine-N,N'-bis(2-ethanesulfonic acid) (PIPES), quaternary ammonium salt of ethylenediaminetetraacetic acid (EDTA) quaternary ammonium sail of (4-(2-hydroxyethyl)-1-piperazineethanesulfonic acid) (HEPES), ethylenediamine derivatives (such as TEMED), (2-hydroxyethyl)trimethylammonium chloride (choline chloride), benzalkonium chloride, betaine, alkylamines, dialkylamines, glutamine, asparagine, arginine, lysine, histidine, polylysine, polyarginine, polyhistidine, polyetbylenimine, poiyethylamine, dimethyl ammonium chloride), and derivatives thereof, and combinations thereof.

In an embodiment of the present disclosure, there is provided a composite comprising: (a) at least one seaweed or seaweed extracts; (b) at least one ammonium salt; and (c) at least: one component selected from the group consisting of an oleophilic component, and an amphiphilic component, wherein the ammonium salt is an organic ammonium salt, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sorgassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and ulvan and wherein the ammonium salt is selected from the group consisting of tris(hydroxymethyl) aminomethane (TRIS), cetyl trimethyl ammonium bromide (CTAB), cetyltrimethylammonium chloride (CTAC) quaternary ammonium salt of piperazine-N,N'-bis(2-ethanesulfonic acid) (PIPES), quaternary ammonium salt of ethylenediaminetetraacetic acid (EDTA) quaternary ammonium salt of (4-(2-hydroxyethyl)-1-piperazineethanesulfonic acid) (HEPES), ethylenediamine derivatives (such as TEMED), (2-hydroxyethyl)trimethylammonium chloride (choline chloride), benzalkonium chloride, betaine, alkylamines, dialkylamines, glutamine, asparagine, arginine, lysine, histidine, polylysine, polyarginine, polyhistidine, polyethylenimine, polyethylamine, poly(diallyl dimethyl ammonium chloride), and derivatives thereof, and combinations thereof:

In an embodiment of the present disclosure, there is provided a composite comprising: (a) at least one seaweed or seaweed extracts; (b) at least one ammonium salt; and (c) an one oleophilic component, wherein the ammonium salt is an organic ammonium salt, and wherein the oleophilic component is selected from the group consisting of palm oil, vegetable oils, essential oils, lipids, and fatty acid esters. In another embodiment of the present disclosure, the oleophilic component is palm oil.

In an embodiment of the present disclosure, there is provided a composite comprising: (a) at least one seaweed or seaweed extracts; (b) at least one ammonium salt; and (c) an amphiphilic component, wherein the ammonium salt is an organic ammonium salt, and wherein the amphiphilic component is selected from the group consisting of sorbitol esters, polysorbates, sodium dodecyl sulfate (SDS), sodium octyl sulfate (SOS), sodium tetradecyl sulfate (STS), and fatty acids, in another embodiment of the present disclosure, the amphiphilic component is sodium dodecyl sulfate (SDS).

In an embodiment of the present disclosure, there is provided a composite comprising: (a) at least one seaweed or seaweed extracts; (b) at least one ammonium salt; and (c) at least one component selected from the group consisting of an oleophilic component, and an amphiphilic component, wherein the ammonium salt is an organic ammonium salt, and wherein the at least one seaweed or seaweed extracts is selected from the group consisting of *Kappaphycus striatus, Eucheuma cottonii, Eucheuma denticulatum* (spinosum) *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sargassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and ulvan, and wherein the ammonium salt is selected from the group consisting of tris(hydroxymethyl) aminomethane (TRIS), cetyl trimethyl ammonium bromide (CTAB), cetyltrimethylammonium chloride (CTAC) quaternary ammonium salt of piperazine-N,N'-bis(2-ethanesulfonic acid) (PIPES), quaternary ammonium salt of ethylenediaminetetraaeetic acid (EDTA) quaternary ammonium salt of (4-(2-hydroxyethyl)-1-piperazineethanesulfonic acid) (HEPES), ethylenediamine derivatives (such as TEMED), (2-hydroxyethyl)trimethylammonium chloride (choline chloride), benzalkonium chloride, betaine, alkylamines, dialkylamines, glutamine, asparagine, arginine, lysine, histidine, polylysine, polyarginine, polyhistidine, polyethylenimine, polyethylamine, poly(diallyl dimethyl ammonium chloride), and derivatives thereof, and combinations thereof wherein the oleophilic component is selected from the group consisting of palm oil, vegetable oils, essential oils, lipids, and fatty acid esters, and wherein the amphiphilic component is selected from the group consisting of sorbitol esters, polysorbates, sodium dodecyl sulfate (SDS), sodium octyl sulfate (SOS), sodium tetradecyl sulfate (STS), and fatty acids.

In an embodiment of the present disclosure, there is provided a composite comprising: (a) at least one seaweed or seaweed extracts having: a weight percentage in the range of 40-99% with respect to the composite on a moisture free basis; and (b) at least one ammonium salt having a weight percentage in the range of 1.45% with respect to the composite on a moisture-free basis, wherein the ammonium salt is an organic ammonium salt, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracliaria gigas, Furcellaria* sp., *Sargassum* sp., *Ascophyllum* sp., *Kelp, Saccharina* sp., *Laminaria* sp., *Asaparagopsis* sp., *Ulva* sp., kappa-carrageenan, iota-carrageenan, lambda-carrageenan, alginate, agar, and ulvan, and wherein the ammonium salt is selected from the group consisting of tris(hydroxymethyl)aminomethane (TRIS), cetyl trimethyl ammonium bromide (CTAB), cetyltrimethylammonium chloride (CTAC) quaternary ammonium salt of piperazine-N,N'-bis(2-ethanesulfonic acid) (PIPES), quaternary ammonium salt of ethylenediaminetetraacetic acid (EDTA) quaternary ammonium salt of (4-(2-hydroxyethyl)-1-piperazineethanesulfonic acid) (HEPES), ethylenediamine derivatives (such as TEMED), (2-hydroxyethyl)trimethylammonium chloride (choline chloride), benzalkonium chloride, betaine, alkylamines, dialkylamines, glutamine, asparagine, arginine, lysine, histidine, polylysine, polyarginine, polyhistidine, polyethylenimine, palyethylamine pills (diallyl dimethyl ammonium chloride), and derivatives thereof, and combinations thereof.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis, wherein the ammonium salt is an organic ammonium salt, and wherein the seaweed or seaweed extract to the ammonium salt weight ratio is in the range of 1.2:1 to 53:1, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sargassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and ulvan, and wherein the ammonium salt is selected from the group consisting of tris(hydroxymethyl)aminomethane (TRIS), cetyl trimethyl ammonium bromide (CTAB), cetyltrimethylammonium chloride (CTAC) quaternary ammonium salt of piperazine-N,N'-bis(2-ethanesulfonic acid) (PIPES), quaternary ammonium salt of ethylenediaminetetraacetic acid (EDTA) quaternary ammonium salt of (4-(2-hydroxyethyl)-1-piperazineethanesulfonic acid) (HEPES), ethylenediamine derivatives (such as TEMED), (2-hydroxyethyl)trimethylammonium chloride (eholine chloride), benzalkonium chloride, betaine, alkylamines, dialkylamines, glutamine, asparagine, arginine, lysine, histidine, polylysine, polyarginine, polyhistidine, polyethylenimine, polyethylamine, poly(diallyl dimethyl ammonium chloride), and derivatives thereof, and combinations thereof.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) an oleophilic component having a weight percentage in the range of 5-15% with respect to the composite on a moisture free basis, and wherein the ammonium salt is an organic ammonium salt, and wherein the seaweed or seaweed extract to the ammonium salt weight ratio is in the range of 1.2:1 to 53:1, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sargassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and ulvan, and wherein the ammonium salt is selected from the group consisting of tris(hydroxymethyl)aminomethane (TRIS), cetyl trimethyl ammonium bromide (CTAB), cetyltrimethylammonium chloride (CTAC) quaternary ammonium salt of piperazine-N,N'-bis(2-ethanesulfonic acid) (PIPES), quaternary ammonium salt of ethylenediaminetetraacetic acid (EDTA) quaternary ammonium salt of (4-(2-hydroxyethyl)-1-piperazineethanesulfonic acid) (HEPES), ethylenediamine derivatives (such as TEMED), (2-hydroxyethyl)trimethylammonium chloride (choline chloride), benzalkonium chloride, betaine, alkylamines, dialkylamines, glutamine, asparagine, arginine, lysine, histidine, polylysine, polyarginine, polyhistidine, polyethylenimine, polyethylamine poly(diallyl dimethyl ammonium chloride), and derivatives thereof, and combinations thereof, and wherein the oleophilic component is selected from the group consisting of palm oil, vegetable oils, essential oils, lipids and fatty acid esters.

In an embodiment of the present disclosure, there is provided a composite comprising: (a) at least one seaweed or seaweed extracts having a weight percentage in the range of 40-99% with respect to the composite on a moisture free basis; and (b) at least one ammonium salt having a weight percentage in the range of 1-45% with respect to the composite on a moisture-free basis; and (c) an amphiphilic component having a weight percentage in the range of 2-53% with respect to the composite on a moisture free basis, wherein the ammonium salt is an organic ammonium salt, and wherein the seaweed or seaweed extract to the ammonium salt weight ratio is in the range of 1.2:1 to 53:1, and wherein the at least one seaweed or seaweed extracts is selected from the group consisting of *Kappaphycus striatus, Eucheuma cottonii, Eucheuma denticulatum* (spinosum), *Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sargassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and 1.11 Van, and wherein the ammonium salt is selected from the group consisting of tris(hydroxymethyl) aminomethane (TRIS), cetyl trimethyl ammonium bromide (CTAB), cetyltrimethylammonium chloride (CTAC) quaternary ammonium salt of piperazine-N,N'-bis(2-ethanesulfonic acid) (PIPES), quaternary ammonium salt of ethylenediaminetetraacetic acid (EDTA) quaternary ammonium salt of (4-(2-hydroxyethyl)-1-piperazineethanesullonic acid) (HEPES), ethylenediamine derivatives (such as TEMED), (2-hydroxyethyl)trimethylammonium chloride (choline chloride), benzalkonium chloride, betaine, alkylamines, dialkylamines, glutamine, asparagine, arginine, lysine, histidine, polylysine, polyarginine, polyhistidine, polyethylenimine, polyethylamine, poly(diallyl dimethyl ammonium chloride), and derivatives thereof, and combinations thereof, and wherein the amphiphilic component is selected from the group consisting of sorbitol esters, polysorbates sodium dodecyl sulfate (SDS), sodium octyl sulfate (SOS) sodium tetradecyl sulfate (STS), and fatty acids.

In an embodiment of the present disclosure, there is provided a composite comprising: (a) at least one seaweed or seaweed extracts; and (b) at, least one ammonium salt, wherein the composite has a moisture content in a range of 2-30%.

In an embodiment of the present disclosure, there is provided a composite as described herein, wherein the composite has a moisture content in the range of 2-30% by weight, and wherein the composite has a dry solids content in a range of 70-98%. In another embodiment of the present disclosure, the composite has a moisture content in the range of 5-25% by weight, and wherein the composite has a dry solids content in a range of 72-90%.

In an embodiment of the present disclosure, there is provided a composite described herein, wherein the composite is in the form selected from the group consisting of thy granules, wet pulps, dry powder, dry flakes, capsules, and wet pastes, and wherein the composite is biodegradable.

In an embodiment of the present disclosure, there is provided a process for preparing the biodegradable composite comprising: (a) at least one seaweed or seaweed extracts; and (b) at least one ammonium salt, wherein the ammonium salt is an organic ammonium salt, said process comprising: (i) obtaining at least one seaweed or seaweed extract; (ii) contacting and heating the seaweed or seaweed extract in at least one solvent to obtain a preheated mixture; (iii) contacting the preheated mixture and at least one ammonium salt to obtain a first mixture, wherein the ammonium salt is an organic ammonium salt; and (iv) evaporating the solvent from the first mixture to obtain the composite, wherein the composite is in the form selected from the group consisting of dry granules, wet pulps, dry powder, dry flakes, capsules, and wet pastes, and wherein the composite is biodegradable.

In an embodiment of the present disclosure, there is provided a process for preparing the biodegradable composite comprising: (a) at least one seaweed or seaweed extracts; and (b) at least one ammonium salt, wherein the ammonium salt is an organic ammonium salt, said process comprising: (i) obtaining at least one seaweed or seaweed extract: (ii) contacting and heating the seaweed or extract in the solvent is done at a temperature in the range of 70-90° C. to obtain the preheated mixture; (iii) contacting the preheated mixture and the ammonium salt is done at a temperature in the range of 70-90° C. for a time in the range of 15-60 minutes to obtain the first mixture, wherein the ammonium salt is an organic ammonium salt and (iv) evaporating the solvent from the first mixture to obtain the composite, wherein the composite is in the form selected from the group consisting of dry granules, wet pulps, dry powder, dry flakes, capsules, and wet pastes, and Wherein the composite is biodegradable.

In an embodiment of the present disclosure, there is provided a process for preparing the composite comprising: (a) at least one seaweed or seaweed extracts; and (b) at least one ammonium salt, wherein the ammonium salt is an organic ammonium salt, said process comprising (i) obtaining at least one seaweed or seaweed extract; (ii) contacting and heating, the seaweed or extract in the solvent is done at a temperature in the range of 70-90° C. to obtain the preheated mixture; (iii) contacting the preheated mixture and the ammonium salt is done at a temperature in the range of 70-90° C. for a time in the range of 15-60 minutes to obtain the first mixture, wherein the ammonium salt is an organic ammonium salt; and (iv) evaporating the solvent from the first mixture to obtain the composite, wherein the solvent is selected from the group consisting of water, acetone, methanol, ethanol, isopropyl alcohol, butanol, acetonitrile, ethyl acetate, dimethyl sulfoxide, chloroform, and dichloromethane, and combinations thereof, and wherein the composite is in the tort selected from the group consisting of dry granules, wet pulps, dry powder, dry flakes, capsules, and wet pastes, and wherein the composite is biodegradable.

In an embodiment of the present disclosure, there is provided a process for preparing the composite comprising: (i) obtaining at least one seaweed or seaweed extract; (ii) contacting and heating the one seaweed or seaweed extract in at least one solvent to obtain a preheated mixture; (iii) contacting the preheated mixture and at least one ammonium salt, at least one component selected from the group consisting of an oleophilic component, and an amphiphilic component to obtain a first mixture, wherein the ammonium salt is an organic ammonium salt; and (iv) evaporating the solvent from the first mixture to obtain the composite, wherein the composite is in the form selected from the group consisting of dry granules, wet pulps, dry powder, dry flakes, capsules, and wet pastes, and wherein the composite is biodegradable.

In an embodiment of the present disclosure, there is provided a process for preparing the composite comprising: (i) obtaining at least one seaweed or seaweed extract; (ii) contacting and heating the seaweed or extract in the solvent is done at a temperature in the range of 70-90° C. to obtain the preheated mixture; (iii) contacting the preheated mixture and the ammonium salt is done at a temperature in the range of 70-90° C. for a time in the range of 15-60 minutes to obtain the first mixture, wherein the ammonium salt is an organic ammonium salt; and (iv) evaporating the solvent from the first mixture to obtain the composite, wherein the solvent is selected from the group consisting of water, acetone, methanol, ethanol, isopropyl alcohol, butanol, acetonitrile, ethyl acetate, dimethyl sulfoxide, chloroform, and dichloromethane, and combinations thereof, and wherein the composite is in the form selected from the group consisting of dry granules, wet pulps, dry powder, dry flakes, capsules, and wet pastes, and wherein the composite is biodegradable.

In an embodiment of the present disclosure, there is provided a process for preparing the composite comprising (a) at least one seaweed or seaweed extracts; and (b) at least one ammonium salt; and (c) an oleophilic component, and wherein the ammonium salt is an organic ammonium salt, said process comprising: (i) obtaining at least one seaweed or seaweed extract; (ii) contacting and heating the one seaweed or seaweed extract in at least one solvent to obtain a preheated mixture; (iii) is contacting the preheated mixture and at least one ammonium salt, and at least one oleophilic component to obtain a first mixture, wherein the ammonium salt is an organic ammonium salt; and (iv) evaporating the solvent from the first mixture to obtain the composite, wherein the composite is in the form selected from the group consisting of dry granules, wet pulps, dry powder, dry flakes, capsules, and wet pastes, and wherein the composite is biodegradable.

In an embodiment of the present disclosure, there is provided a process for preparing the composite comprising (a) at least one seaweed or seaweed extracts; and (b) at least one ammonium salt; and (c) an oleophilic component, and wherein the ammonium salt is an organic ammonium salt, said process comprising: (i) obtaining at least one seaweed or seaweed extract; (ii) contacting and heating the seaweed or extract in the solvent is done at a temperature in the range of 70-90° C. to obtain the preheated mixture; (iii) contacting the preheated mixture and at least one ammonium salt; and at least one oleophilic component is done at a temperature in the range of 70-130° C. for a time in the range of 15-120 minutes to obtain a first mixture, wherein the ammonium salt is an organic ammonium salt; and (iv) evaporating the solvent from the first mixture to obtain the composite, wherein the solvent is selected from the group consisting of water, acetone, methanol, ethanol, isopropyl alcohol, butanol, acetonitrile, ethyl acetate, dimethyl sulfoxide, chloroform, and dichloromethane, and combinations thereof, and wherein the composite is in the form selected from the group consisting of dry granules, wet pulps, dry powder, dry flakes, capsules, and wet pastes, and wherein the composite is biodegradable.

In an embodiment of the present disclosure, there is provided a process for preparing the composite comprising (a) at least one seaweed or seaweed extracts; and (b) at least one ammonium salt; and (c) an amphiphilic component, and wherein the ammonium salt is an organic ammonium salt, said process comprising: (i) obtaining at least one seaweed or seaweed extract; (ii) contacting and heating the one seaweed or seaweed extract in at least one solvent to obtain a preheated mixture; contacting the preheated mixture and at least one ammonium salt, and at least one amphiphilic component to obtain a first mixture, wherein the ammonium salt is an organic ammonium salt; and (iv) evaporating the solvent from the first mixture to obtain the composite, wherein the composite is in the form selected from the group consisting of dry granules, wet pulps, dry powder, dry flakes, capsules, and wet pastes, and wherein the composite is biodegradable.

In an embodiment of the present disclosure, there is provided a process for preparing the composite comprising (a) at least one seaweed or seaweed extracts; and (b) at least one ammonium salt; and (c) an amphiphilic component, and wherein the ammonium salt is an organic ammonium salt, said process comprising: (i) obtaining at least one seaweed or seaweed extract; (ii) contacting and hearing the one seaweed or seaweed extract in at least one solvent is done at a temperature in the range of 70-90° C. to obtain a preheated mixture; (iii) contacting the preheated mixture, and the ammonium salt, and the amphiphilic component, is done at a temperature in the range of 70-130° C. for a time in the range of 15-120 minutes to obtain the first mixture, Wherein the ammonium salt is an organic ammonium salt; and (iv) evaporating the solvent from the first mixture to obtain the composite, wherein the solvent is selected from the group consisting of water, acetone, methanol, ethanol, isopropyl alcohol, butanol, acetonitrile ethyl acetate, dimethyl sulfoxide, chloroform, and dichloromethane, and combinations thereof, and wherein the composite is in the form selected from the group consisting of dry granules, wet pulps, dry powder, dry flakes, capsules, and wet pastes, and wherein the composite is biodegradable.

In an embodiment of the present disclosure, there is provided an article comprising the composite as described herein, wherein the composite is in the form selected from the group consisting dry granules, wet pulps, dry powder, dry flakes, capsules, and wet pastes, and wherein the composite is biodegradable.

In an embodiment of the present disclosure, there is provided an article as described herein, wherein said article is selected from the group consisting of films, bioplastic films, thermoformed inserts, sheets, sachets for both dry and wet materials, laminates, banners, loose fill for packaging, secondary packaging, bubble wrap, coatings, inner lining for cardboard boxes, multilayer films with at least one of the layers comprising the composite, blister packs, boxes, waste collection bags, shopping bags, bottles, trays, cups, lids, nettings, tubs for produce, pouches, jars, tunes, teabags, capsules, plates, straws, spoons, forks, food wraps, agricultural mulch films, plant pots, seed strips, twine, ties, clips, tapes, thread, gloves, masks, gowns, plastic replacement for electronics, automobile, aerospace, houseware, and textiles.

In an embodiment of the present disclosure, there is provided an article as described herein, wherein the article is bioplastic film.

In an embodiment of the present disclosure, there is provided a process for preparing the article comprising the composite, said composite comprising: (a) at least one seaweed or seaweed extracts; and (b) at least one ammonium salt, wherein the ammonium salt is an organic ammonium salt, said method comprising: (i) obtaining at least one seaweed or seaweed extract; (ii) contacting and heating the seaweed or seaweed extract in at least one solvent is done at a temperature in the range of 70-90° C. to obtain a preheated mixture: (iii) contacting the preheated mixture and at least one ammonium salt is done at a temperature in the range of 70-130° C. for a time in the range of 15-120 minutes to obtain a first mixture, wherein the ammonium salt is an organic ammonium salt: (iv) transferring the first mixture into a mold or an extruder to obtain a molded composite; and (v) evaporating the solvent from the molded composite to obtain the article, wherein the solvent is selected hoar the group consisting of water, acetone, methanol, ethanol, isopropyl alcohol, butanol, acetonitrile ethyl acetate, dimethyl sulfoxide, chloroform, and dichloromethane, and combinations thereof.

In an embodiment of the present disclosure, there is provided a process for preparing the article comprising the composite, said composite comprising: (a) at least one seaweed or seaweed extracts; and (b) at least one ammonium salt; (c) at least one component selected from the group consisting of an oleophilic component, and an amphiphilic component, wherein the ammonium salt is an organic ammonium salt, said process comprising. (i) obtaining at least: one seaweed or seaweed extract; (ii) contacting and heating the one seaweed or seaweed extract in at least one solvent is done at a temperature in the range of 70-90° C. to obtain a preheated mixture to obtain a preheated mixture (iii) contacting the preheated mixture and at least one ammonium salt, at least one component selected from the group consisting of an oleophilic component, and an amphiphilic component is done at a temperature in the range of 70-130° C. for a time in the range of 15-120 minutes to obtain a first mixture, wherein the ammonium salt is art organic ammonium salt; (iv) transferring the fast mixture into a mold or an extruder to obtain a molded composite; and (v) evaporating the solvent from the molded composite to obtain the article, wherein the solvent is selected from the group consisting of water, acetone, methanol, ethanol, isopropyl alcohol, butanol, acetonitrile, ethyl acetate, dimethyl sulfoxide, chloroform, and dichloromethane, and combinations thereof.

In an embodiment of the present disclosure, there is provided a process for preparing the article comprising the composite, said composite comprising: (a) at least one seaweed or seaweed extracts; and (b) at least one ammonium salt; (c) an oleophilic component, wherein the ammonium salt is an organic ammonium salt, said process comprising: (i) obtaining at least one seaweed or seaweed extract; (ii) contacting and heating the one seaweed or seaweed extract in at least one solvent is done at a temperature in the range of 70-90° C. to obtain a preheated mixture; (iii) contacting the preheated mixture and at least one ammonium salt, and at least one oleophilic component is done at a temperature in the range of 70-130° C. for a time in the range of 15-120 minutes to obtain a first mixture, wherein the ammonium salt is an organic ammonium salt; (iv) transferring the first mixture into a mold or an extruder to obtain a molded composite; and (v) evaporating the solvent from the molded composite to obtain the article, wherein the solvent is selected from the group consisting of water, acetone, methanol, ethanol, isopropyl alcohol, butanol, acetonitrile, ethyl acetate, dimethyl sulfoxide, chloroform, and dichloromethane, and combinations thereof.

In an embodiment of the present disclosure, there is provided a process for preparing the article comprising the composite, said composite comprising: (a) at least one seaweed or seaweed extracts; and (b) at least one ammonium salt; (c) an amphiphilic component, wherein the ammonium salt is an organic ammonium salt, said process comprising: (i) obtaining at least one seaweed or seaweed extract; (ii) contacting and heating the one seaweed or seaweed extract in at least one solvent is done at a temperature in the range of 70-90° C. to obtain a preheated mixture; (iii) contacting the preheated mixture and at least one ammonium salt, and at least one amphiphilic component is done at a temperature in the range of 70-90° C. for a time in the range of 15-60 minutes to obtain a first mixture, wherein the ammonium salt is an organic ammonium salt; (iv) transferring the first mixture into a mold or an extruder to obtain a molded composite; and (v) evaporating the solvent from the molded composite to obtain the article, wherein the solvent is selected from the group consisting of water, acetone methanol, ethanol, isopropyl alcohol, butanol, acetonitrile, ethyl acetate, dimethyl sulfoxide, chloroform, and dichloromethane, and combinations thereof.

In an embodiment of the present disclosure, there is provided an article as described herein, wherein the article further comprises at least one additive selected from the group consisting of plant fibre, natural fibre, gum, synthetic fibre.

In an embodiment of the present disclosure, there is provided an article as described herein, wherein the article further comprises at least one additive selected from the group consisting of plant fibre is selected from the group consisting of jute, cotton, flax fiber linen, paper, wood pulp, bagasse, cardboard waste, natural rubber, celluloses, starches, the natural fibre is selected from the group consisting of silk, wool milk proteins, egg proteins, vegetable proteins, chitosan, collagen, hyaluronic acid, xyloglucan, curdlan, dextran, arabinoxylans, polyhydroxybutyrate, polyhydroxyalkanoates, beta-glucans, inulin, agricultural waste, food waste, vegetable waste, the gum is selected from the group consisting of gelatin, guar gum, karaya gum, gum tragacanth pectin, locust bean gum, pullulan, xanthan gum, gellan gum, galactomannam gum, gum arabic, gun acacia, gum ghatti, konjac glucomannan, and the synthetic fibre is selected from the group consisting of polylactic acid, polyvinyl alcohol, polybutylene succinate, polycaprolactone, and polybutylene adipate terephthalate.

Although the subject matter has been described in considerable detail with reference to certain examples and implementations thereof, other implementations are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices, and materials are described herein. It is to be understood that this disclosure is not limited to particular methods, and experimental conditions described, as such methods and conditions may apply.

The examples in the forthcoming section demonstrate a biodegradable composite comprising: at least one seaweed or seaweed extracts; and at least one ammonium salt, wherein the ammonium salt is an organic ammonium salt. The examples demonstrates the presence of the non-toxic organic ammonium salt in the disclosed weight percentage range (1-45%) is crucial for arriving at the composite of the present disclosure, wherein the organic ammonium salts forms ionic, covalent and/or coordinate covalent interactions with the seaweed or seaweed extracts and makes it compatible for forming a homogeneous material when further reacted with oleophilic or amphiphilic compounds. The examples highlight another critical feature of the present disclosure which the presence of the seaweed or seaweed extract to the ammonium salt in the weight ratio range of 1.2:1 to 53:1. Any deviation from the disclosed weight percentage range (1-45%) of organic ammonium salt, affects the aquaphobicity of the composite. Similarly, even by replacing the organic ammonium salt with any other inorganic ammonium salt: would not lead to the composite that have desired characteristic properties. The presence of ammonium salts, and/or at least one oleophilic component and/or at least one amphiphilic component helps in tuning the aquaphobicity of the composite. Further, the mild reaction condition employed in the process for preparing the biodegradable composite in the presence of water/water-acetone solvent system also helps to achieve the aquaphobic biodegradable composite. Moreover, the examples also show the use of the biodegradable composite in the preparation of article, such as, the is bioplastic film.

Example 1

Extraction of Seaweed Polysaccharide (SP) from Seaweed Biomass

Fresh diced seaweed from *Kappaphycus alvarezii* was obtained from Bali, Indonesia. 1 kg of fresh diced seaweed was subjected to mechanical separation to obtain 410 gm of seaweed pulp having a moisture content of 86% which was then dried to obtain dried seaweed pulp having a moisture content of less than 30%. Alternately, fresh seaweed *Kappaphycus alvarezii* was sourced in Bali, Indonesia and processed to obtain seaweed pulp which was dried in Bali, Indonesia to obtain the dried seaweed pulp. Alternately, raw dried seaweed *Kappaphycus alvarezii* was sourced in Bali, Indonesia and mechanically processed to obtained dried seaweed pulp.

6 gm of dried seaweed pulp was taken in a 1 L bottle with 600 rail of tap water to prepare a 1% w/w suspension. The whole mixture was soaked for 15 min and then heated at 90° C. for 2 h to dissolve the seaweed pulp in order to form a solution, After incubation, the solution was hot filtered by using a muslin cloth to remove the un-dissolved residues. 15 gm of KCl was added to the hot filtrate to obtain a mixture. This mixture was kept in a cold room for about 30 minutes for cooling and gelation. The soft gel biomass was filtered through a muslin cloth and then water was squeezed out overnight. The filtered gel was placed in a tray and oven-dried at 70° C. overnight to obtain the dried seaweed polysaccharides (SP), SP was used further in all the subsequent examples.

Although the aforementioned process was carried out with *Kappaphycus alvarezii*, however, it can be contemplated that a person skilled in the art can carry out the aforementioned process with other seaweeds as well, especially those which are also carrageenan containing, such as *Kappaphycus striatus, Halymenia durvillaea, Chondrus crispus, Porphyra purpurea, Eucheuma isiforme, Hypnea musciformis, Solieria filiformis, Mastocarpus stellatus, Porphyra capensis, Gigartina skottsbergii*, and *Furcellaria* sp.

Example 2

Preparation of Seaweed Polysaccharide (SP) Film 0.25 gm of dried seaweed polysaccharide (SP) front Example 1 was further dissolved in 20 mL of water (solvent) and then whole solution was stirred at 80° C. for 1 hr. The solution was poured into petri dish, and the water (solvent) was allowed to evaporate to obtain a seaweed polysaccharide based composite film or Composite 1.

Example 3

Preparation of Choline Chloride Incorporated Seaweed Composite Film

To the preheated (80° C.) solution (preheated mixture) of 0.25 gm of seaweed polysaccharide (SP) in 15 mL of water. 0.091 gm of choline chloride (organic ammonium salt) in 5 mL of water was added to obtain a first mixture.

Subsequently, the first mixture or whole mixture was allowed to mix well at a temperature of 80° C. for 30 min and later, the heated mixture was poured into a petri dish and then the water (solvent) was slowly evaporated in an oven for 3 h to obtain a circular transparent film prior to characterization. The composite film obtained in this example is choline chloride incorporated seaweed polysaccharide film (SP+Ch.Cl) or Composite 2, FIG. 1(a) depicts choline incorporated seaweed polysaccharide film.

Example 4

Preparation of Tris(hydroxymethyl)aminomethane (TRIS) Incorporated Seaweed Composite Film To the preheated (80° C.) solution of 0.25 gm of seaweed polysaccharide (SP) in 10 mL of water, 0.079 gm of tris (hydroxymethyl)aminomethane (TRIS) (organic ammonium salt) in 3 mL of water was added to obtain a first mixture. The first mixture was then allowed to mix well at a temperature of 80° C. for 30 min and later, the heated solution was poured into a petri dish. Then, the water (solvent) was slowly evaporated in an oven for 3 h to get circular transparent film prior to characterization. The composite film obtained in this example is tris(hydroxymethyl)aminomethane (TRIS) incorporated seaweed composite film (SP+TRIS) or Composite 3. FIG. 1(b) depicts tris(hydroxymethyl)aminomethane (TRIS) incorporated seaweed composite film.

Example 5

Preparation of Tetramethylethylenediamine (TEMED) Incorporated Seaweed Composite Film To the preheated (80° C.) solution of 0.25 gm of seaweed polysaccharide (SP) in 10 mL of water, 0.0138 gm of cationic TEMED (pH=5-6) (organic ammonium salt) in 3 mL of water was added to obtain a first mixture. Then the whole first mixture was then allowed to mix well at a temperature of 80° C. for 1 h. Later, the heated solution was poured into a petri dish and the water (solvent) was slowly evaporated in an oven for 3 h to obtain a circular prior to characterization. The composite film obtained in this example is Tetramethylethylenediamine (TEMED) incorporated seaweed composite film (SP+TEMED) or Composite 4.

Example 6

Preparation of (2-hyroxyethyl)trimethylammonium Chloride (Choline Chloride), Glycerol and Sodium Dodecyl Sulfate Mixture Incorporated Seaweed Composite Film To the preheated (80° C.) solution of 0.25 gm of seaweed polysaccharide (SP) in 20 mL of water, 0.136 gm of (2-hydroxyethyl)trimethylammonium chloride (choline chloride or Ch.Cl) (organic ammonium salt), 0.093 gm of sodium dodecyl sulfate (SDS) (amphiphilic component) and 0.06 gm of glycerol (plasticizer) in 5 mL of water were added, to obtain a first mixture. Then the whole mixture was stirred at 80° C. to mix well for 1 h and later, the heated solution was poured into a petri dish. The water (solvent) was slowly evaporated in an oven for 3 h to get circular film prior to characterization. The composite film obtained in this example is (2-hydroxyethyl)trimethylammonium chloride (choline chloride), glycerol and sodium dodecyl sulfate mixture incorporated seaweed composite film (SP+Ch.Cl+SDS+Gly) or Composite 5. FIG. 1(c) depicts the choline chloride, glycerol and SDS mixture incorporated seaweed polysaccharide composite film.

Example 7

Preparation of Choline Chloride, Palm Oil And Cetyl Trimethyl Ammonium Bromide (CTAB) Incorporated Seaweed Composite Film To the preheated (80° C.) solution of 0.25 gm of seaweed polysaccharide (SP) in 20 mL of water, 0.074 gm of (2-hydroxyethyl)trimethylammonium chloride (choline chloride) in 5 mL of water was added, followed by the addition of emulsified solution of 0.012 gm of cetyl trimethyl ammonium bromide (CTAB) and 0.025 mL of palm oil (oleophilic component) in 5 mL of water to obtain a first mixture. The milky white solution or first mixture was stirred at 80° C. to mix well for 1 h and later the heated solution was poured into a petri dish. Then the solvent was allowed to slowly evaporate in an oven for 3 h to get circular transparent film prior to characterization. The composite film obtained in this example is choline chloride, palm oil and cetyl trimethyl ammonium bromide (CTAB) incorporated seaweed composite film. FIG. 1(d) depicts the choline chloride, palm oil and cetyl trimethyl, ammonium bromide (CTAB) incorporated seaweed composite film (SP+CTAB+Ch.Cl+PO) or Composite 6.

Example 8

Preparation of CTAB and SPAN 80 Incorporated Seaweed Based Composite Film

To the preheated (80° C.) solution of 0.25 gm of seaweed polysaccharide (SP) in 20 mL of water, a mixture of 0.29 gm of SPAN 80 (polysorbate 80; amphiphilic component) and 0.012 g of CTAB in 10 mL of $H_2O$/Acetone (1:1 v/v; solvent) was slowly added with vigorous stirring. After the addition of mixture of SPAN 80 and CTAB, the whole mixture was stirred at 120° C. to remove the acetone for 2 h and later the heated solution was poured into the glass/polystyrene petri dish and then the solvent was slowly evaporated in an oven at 70° C. The composite film obtained in this example is CTAB and SPAN 80 incorporated seaweed based composite film (SP+CTAB+SPAN 80) or Composite 7, FIG. 1(e) depicts the CTAB and SPAN 80 incorporated seaweed composite film.

Example 9

Preparation of Dry Seaweed Fiber (DST) Powder

Fresh diced seaweed from *Kappaphycus alvarezii* was obtained from Bali, Indonesia, 1 kg of fresh diced seaweed was subjected to mechanical separation to obtain 410 gm of seaweed pulp having a moisture content of 86% which was then dried to obtain dried seaweed pulp having a moisture content of less than 30%.

Alternately, fresh seaweed *Kappaphycus airvarezii* was sourced in Bali, Indonesia and processed to obtain seaweed pulp which was dried in Bali, Indonesia to obtain the dried seaweed pulp. Alternately, raw dried seaweed *Kappaphycus alvarezii* was sourced in Bali, Indonesia and mechanically processed to obtained dried seaweed pulp.

The dried seaweed pulp was subjected to size reduction to obtain a 60 mesh powder (<250 microns) which was used as DSF powder of *Kappaphycus alvarezii*. The same procedure was carried out by using another fresh seaweed, *Eucheuma denticulatum* (spinosum), which was also obtained from Bali, Indonesia, to obtain DSF powder of spinosum (sp-DSF). DSF powder in general is referred to as Composite 8.

Although the aforementioned process was carried out with *Kappaphycus alvarezii* and *Eucheuma denticulatum* (spinosum), however, it can be contemplated that a person skilled in the art can carry out the aforementioned process with other seaweeds as well, especially those which are also carrageenan containing such as *Kappaphycus striatus, Halymenia durvillaea, Chondrus crispus, Porphyra purpurea, Eucheuma isiforme, Hypnea musciformis, Solieria filiformis, Mastocarpus stellatus, Porphyra capensis, Gigartina skottsbergii*, and *Furcellaria* sp.

Example 10

Preparation of Films From Dry Seaweed Fiber Powder (DSF)

0.5 gm of dry seaweed fiber powder (DSF) from Example 9 was further dissolved in 30 mL of water, and then whole solution was heated at 90° C. for 1 h. Later, the heated solution was poured into a petri dish and the water (solvent) was slowly evaporated in an oven for 3 h to obtain a circular film, prior to characterization. The composite film obtained in this example is dry seaweed fiber powder (DSF) or Composite 9.

Example 11

Preparation Choline Chloride Incorporated Dry Seaweed Fiber Powder Based Composite Film To the preheated (90° C.) solution of 0.5 gm of thy seaweed fiber powder (DSF) in 25 mL of water, 0.18 gm of choline chloride in 5 mL of water was added to obtain a first mixture. Then the whole first mixture was allowed to mix well at a temperature of 90° C. for 30 min and later, the heated solution was poured into a petri dish and then the solvent was slowly evaporated in an oven for 3 h to get circular transparent film prior to characterization. The composite film obtained in this example is choline chloride incorporated based thy seaweed fiber powder composite film (DSF+Ch.Cl) or Composite 10.

Example 12

Preparation of Tris(hydroxymethyl)aminomethane (TRIS) Incorporated Dry Seaweed Fiber Powder Based Composite Film To the preheated (90° C.) solution of 0.5 gm of dry seaweed fiber powder (DSF) in 25 mL of water, 0.15 gm of tris(hydroxymethyl)aminomethane (TRIS) in of water was added to obtain at first mixture. Then the whole mixture was allowed to mix well at a temperature of 90° C. for 30 min and later, the heated solution was poured into a petri dish. Subsequently, the water (solvent) was allowed to slowly evaporate in an oven for 3 h to get circular transparent film prior to characterization. The composite film obtained in this example is tris(hydroxymethyl)aminomethane (TRIS) incorporated based dry seaweed fiber powder composite film (DSF+TRIS) or Composite 11.

Example 13

Preparation of (2-hydroxyethyl)trimethylammonium Chloride (Choline Chloride), Glycerol and Sodium Dodecyl Sulfate Mixture Incorporated Dry Seaweed Fiber Powder Composite Film To the preheated (90° C.) solution of 0.5 gm of dry seaweed fiber powder (DSF) in 20 mL of water, 0.27 gm of (2-hydroxyethyl)trimethylammonium chloride (choline chloride or Ch.Cl), 0.187 gm of sodium dodecyl sulfate (SDS) and 0.12 g of glycerol in 10 mL of water were added to obtain a first mixture. The whole first mixture was stirred at 90° C. to mix well for 1 h and later, the heated solution was poured into a petri dish. Subsequently, the water (solvent) was slowly evaporated in an oven for 3 h to get circular film prior to characterization. The composite film obtained in this example is (2-hydroxyethyl)trimethylammonium chloride (choline chloride), glycerol and sodium dodecyl sulfate mixture incorporated dry seaweed fiber powder composite film (DSF+SDS+CH.Cl+Gly) or Composite 12.

Example 14

Preparation of Choline Chloride, Palm Oil And Cetyl Trimethyl Ammonium Bromide (CTAB) Incorporated Dry Seaweed Fiber Powder Composite Film To the preheated (90° C.) solution of 0.5 gm of dry seaweed fiber powder (DSF) in 20 of water, 0.148 gm of (2-hydroxyethyl)trimethylammonium chloride (choline chloride) in 5 mL of water was added, followed by the addition of emulsified solution of 0.022 gm of cetyl trimethyl ammonium bromide (CTAB) and 0.05 mL of palm oil in 10 mL of water were added to obtain a first mixture. Then the milky white solution (first mixture) was stirred at 90° C. to mix well fix 1 h and later the heated solution was poured into a petri dish and then the water (solvent) was slowly evaporated in an oven for 3 h to get circular transparent film prior to characterization. The composite film obtained in this example is choline chloride, palm oil and cetyl trimethyl ammonium bromide AB) incorporated dry, seaweed fiber powder composite film (DSF+CTAB+CH.Cl+PO) or Composite 13.

Example 15

Preparation of Palm Oil Incorporated Dry Seaweed Fiber Powder Composite Film

To the preheated (90° C.) solution of 0.5 gm of dry seaweed fiber powder (DSF) in 20 mL of water. 0.075 mL of palm oil was added to obtain a first mixture. Then the milky white solution (first mixture) was stirred at 90° C. to mix well for 1 h and later the heated solution was poured into a petri dish and then the solvent was slowly evaporated in an oven for 3 h to get circular transparent film prior to characterization. The composite film obtained in this example is palm oil incorporated dry seaweed fiber powder composite film (DSF+PO) or Composite 14.

Example 16

Preparation of CTAB and SPAN 80 Incorporated Dry Seaweed Fiber Powder Seaweed Based Composite Film To the preheated (90° C.) solution of 0.5 gm of dry seaweed fiber powder (DSF) in 20 mL of water, a mixture of 0.568 gm of SPAN 80 (Polysorbate 80) and 0.022 gm of CTAB in 10 mL of H$_2$O/Acetone (1:1 v/v) was slowly added with vigorous stirring to obtain the first mixture. After the addition of mixture of SPAN 80 and CTAB, the whole first mixture was stirred at 120° C. to remove the acetone for 2 h and later the heated solution was poured into the glass/polystyrene petri dish and then the solvent was slowly evaporated in an oven at 70° C. The composite film obtained in this example is CTAB and SPAN 80 incorporated dry seaweed fiber powder seaweed based composite film (DSF+CTAB+SPAN 80) or Composite 15.

Example 17

Preparation of Poly-L-lysine (i.e. Polyamine) Incorporated Dry Seaweed Fiber Powder Based Composite Film To the preheated (90° C.) solution of 0.5 gm of dry seaweed fiber powder (DSF) in 25 mL of water, 0.017 gm of cationic poly-L-lysine (pH=5-6) in 3 mL of water was added to obtain a first mixture. Then the whole first mixture was stirred at 90° C. to mix well for 1 h. Later, the heated solution was poured into a petri dish and the solvent was slowly evaporated in an oven for 3 h to obtain a circular film, prior to characterization. The composite film obtained in this example is poly-L-lysine (i.e. polyamine) incorporated dry seaweed fiber powder based composite film (DSF+poly-L-lysine) or Composite 16.

Example 18

Preparation of CTAB Incorporated Dry Seaweed Fiber Powder Based Composite Film

To the preheated (90° C.) solution of 0.5 gm of dry seaweed fiber powder (DSF) in 25 mL of water, 0.025 gm of CTAB in 5 mL of water was added to obtain a first mixture. Then the whole first mixture was allowed to mix well at a temperature of 90° C. for 30 min and later, the heated solution was poured into a petri dish and then the water (solvent) was slowly evaporated in an oven for 3 h to get circular transparent film prior to characterization. The composite film obtained in this example is CTAB incorporated dry seaweed fiber powder based composite film DSF+CTAB) or Composite 17.

Example 19

Preparation of Tetramethylethylenediamine (TEMED) Incorporated Dry Seaweed Fiber Powder Based Composite Film To the preheated (90° C.) solution of 0.5 gm of dry seaweed fiber powder film in 10 mL of water, 0.075 gm of cationic TEMED (pH=5-6) in 3 mL of water was added to obtain a first mixture. Then the whole first mixture was stirred at 90° C. to mix well for 1 h. Later, the heated solution was poured into a petit dish and the solvent was slowly evaporated in an oven for 3 h to obtain a circular film, prior to characterization. The composite film obtained in this example is tetramethylethylenediamine (TEMED) incorporated dry seaweed fiber powder based composite film (DSF+TEMED) Composite 18, Example 20

Preparation of Dry Spinosum Seaweed Fiber (sp-DSF) Based Film

About 1 gm of dry spinosum seaweed fiber (sp-DSF) powder obtained in Example 9, was dissolved in 30 mL, of water, and the mixture was subsequently heated at 90° C. for 1 h. Later, the heated solution was poured into a petri dish and the water (solvent) was slowly evaporated in an oven for 3 h to obtain a circular film, prior to characterization. The composite film obtained in this example is dry spinosum seaweed fiber (sp-DSF) based film (sp-DSF) or Composite 19.

Example 21

Preparation Choline Chloride Incorporated Spinosum Based Seaweed Composite Film

To the preheated (90° C.) solution of 1 gm of dry spinosum seaweed fiber (sp-DSF) in 25 mL of water, 0.3 gm of choline chloride in 5 mL of water was added to obtain a first mixture. Then the whole first mixture was allowed to mix well at a temperature of 90° C., fix 30 min. Subsequently, the heated solution was poured into a petri dish and then the water (solvent) was slowly evaporated in an oven for 3 h get circular transparent film prior to characterization. The composite film obtained in this example is choline chloride incorporated spinosum-based seaweed composite film (sp-DSF+Choline chloride) or Composite 20.

Example 22

Preparation of Tris(hydroxymethyl)aminomethane (TRIS) Incorporated Spinosum Based Seaweed Composite Film To the preheated (90° C.) solution of gm of dry spinosum seaweed fiber (sp-DSF) in 25 mL of water, 0.261 gm of tris(hydroxymethyl)aminomethane (TRIS) in 5 mL of water was added to obtain a first mixture. Then the whole first mixture was allowed to mix well at a temperature of 90° C. for 1 hr and later, the heated solution was poured into a petri dish. Subsequently, the water (solvent) was slowly evaporated in an oven for 3 h to get circular transparent film prior to characterization. The composite film obtained in this example is tris(hydroxymethyl)aminomethane (TRIS) incorporated spinosum based seaweed composite film (sp-DSF+TRIS) or composite 21.

Example 23

Preparation of (2-hydroxyethyl)trimethylammonium Chloride (Choline Chloride), Glycerol and Sodium Dodecyl Sulfate Mixture Incorporated Spinosum Seaweed Composite Film To the preheated (90° C.)) solution of 1 gm of dry spinosum seaweed fiber (sp-DSF) in 20 mL of water, 0.451 gm of (2-hydroxyethyl)trimethylammonium chloride (choline chloride or Ch.Cl), 0.31 gm of sodium dodecyl sulfate (SDS) and 0.1 g of glycerol in 10 mL of water were added to obtain a first mixture. Then the whole mixture was stirred at 90° C. to mix well for 1 h and later, the heated solution was poured into a petri dish and then the water (solvent) was slowly evaporated in an oven for 3 h to get circular flint prior to characterization. The composite film obtained in this example is (2-hydroxyethyl)trimethylammonium chloride (choline chloride), glycerol and sodium dodecyl sulfate mixture, incorporated spinosum seaweed composite film (sp-DSF+SDS+Choline chloride+Gly) or Composite 22.

Example 24

Preparation of Choline Chloride, Palm Oil And Cetyl Trimethyl Ammonium Bromide (CTAB) Incorporated Spinosum Seaweed Composite Film To the preheated (90° C.) solution of 1 gm of dry spinosum seaweed fiber (sp-DSF) in 20 mL of water, 0.143 gm of (2-hydroxyethyl)trimethylammonium chloride (choline chloride) in 5 mL of water was added, followed by the addition of emulsified solution of 0.039 gm of cetyl trimethyl ammonium bromide (CTAB) and 0.1 mL of palm oil in 10 mL of water were added to obtain a first mixture. Then the milky white solution or first mixture was stirred at 90° C. to mix well for and later the heated solution was poured into a petri dish and then the solvent was slowly evaporated in an oven for 3 h to get circular transparent film prior to characterization. The composite film obtained in this example is choline chloride, paint oil and cetyl trimethyl ammonium bromide (CTAB) incorporated spinosum seaweed composite (sp-DSF+CTAB+choline chloride+palm oil) or Composite 23.

Example 25

Preparation of CTAB and SPAN 80 Incorporated Spinosum as Seaweed Based Composite Film To the preheated (90° C.) solution of 1 gm of dry spinosum seaweed fiber (sp-DSF) to 20 mL, a mixture of 0.461 gm of SPAN 80 and 0.039 gm of CTAB in 10 mL and of $H_2O$/Acetone (1:1 v/v) was slowly added with vigorous stirring, to obtain a first mixture After the addition of mixture of SPAN 80 and CTAB, the whole first mixture was stirred at 120° C. to remove the acetone for 2 h and later the heated solution as poured into the glass/polystyrene petri dish and then the $H_2O$/Acetone (solvent) was slowly evaporated in an oven at 70° C. for 3 h. The composite film obtained in this example is CTAB and SPAN 80 incorporated spinosum seaweed based composite film (sp-DSF+CTAB+SPAN 80) or Composite 24.

Example 26

Preparation Choline Chloride Incorporated Seaweed Composite Film

To the preheated (80° C.) solution of 0.25 gm of seaweed polysaccharide, (SP) in 15 mL of water, 0.27 gm of choline chloride in 5 mL of water was added. Then the whole mixture was allowed to mix well at a temperature of 80° C. for 30 min and later, the heated solution was poured into a petri dish and then the water (solvent) was slowly evaporated in art oven for 3 h to get circular transparent film prior to characterization. It was observed that the film had very poor film stability. The composite film Obtained in this example is Choline chloride incorporated seaweed composite film (SP+Ch.Cl) having seaweed polysaccharide to choline chloride at a weight ratio of 0.9:1, or Composite 25.

Example 27

Preparation CTAB Incorporated Seaweed Composite Film

To the preheated (80° C.) solution of 0.25 gm of seaweed polysaccharide (SP) in 15 mL of water, 0.238 gm of CTAB in 8 mL of water was added. Upon addition of CTAB, a fibrous product was formed which was then filtered and then dried in open air to obtain a fibre-like product which did not form a film indicating that it has a very poor mechanical stability. The composite film obtained in this example is CTAB incorporated seaweed composite film having a weight ratio of 1.05:1 (SP+CTAB) or Composite 26.

Example 28

Preparation of Choline Chloride, Palm Oil And Sodium Dodecyl Sulfate Incorporated Seaweed Composite Film To the preheated (80° C.) solution of 0.25 gm of seaweed polysaccharide (SP) in 20 of water, 0.091 gm of (2-hydroxyethyl)trimethylammonium chloride (choline chloride or Ch.Cl), 0.010 gm of sodium dodecyl sulfate (SDS) and 0.025 mL of palm oil in 5 mL of water were added to obtain a first mixture. Then the whole mixture was stirred at 80° C. to mix well for 1 h and later, the heated solution was poured into a petri dish and then the water (solvent) was slowly evaporated under an oven for 3 h to get circular film prior to characterization. The composite film obtained in this example is choline chloride, palm oil and sodium dodecyl sulfate incorporated seaweed composite film (SP+Ch.Cl+PO+SDS) or Composite 27.

Example 29

Preparation of Palm Oil And TEMED Incorporated Seaweed Composite Film

To the preheated (90° C.) solution of 0.5 gm of dry seaweed fiber powder in 25 mL of water, 0.05 mL of palm oil was added followed by 0.075 g of cationic TEMED (pH=5-6) in 5 mL of water was added to obtain a first mixture. Then the whole mixture was stirred at 90° C. to mix well for 1 h. Later, the heated solution was poured into a petri dish and the solvent was slowly evaporated in an oven for 3 h to obtain a circular film, prior to characterization. The composite film obtained in this example is palm oil and TEMED incorporated seaweed composite film (DSF+TEMED+PO) or Composite 28.

Example 30

Preparation of Films From Sodium Alginate Powder (SA)

1 gm of sodium alginate powder (SA) (seaweed polysaccharide) procured from Urban Platter was dissolved in 30 mL of water, and then the solution was heated at 90° C. for 1 h to obtain a preheated mixture, Later, the heated solution was poured into a petri dish and the water (solvent) was slowly evaporated under an oven for 3 h to obtain a circular film, prior to characterization. The composite film obtained in this example is sodium alginate powder based composite film (SA) or Composite 29.

Example 31

Preparation of Tetramethylethylenediamine (TEMED) Incorporated Sodium Alginate Film To the preheated (90° C.) solution of sodium alginate (SA) from Urban Platter (1.0 g) in 25 mL, 0.145 gm of cationic TEMED (pH=5-6) in 5 mL was added, to obtain a first mixture. Then the whole first mixture was stirred at 90° C. to mix well for 1 h. Later, the heated solution was poured into a petri dish and the solvent was slowly evaporated under an oven for 3 h to obtain a circular film, prior to characterization. The composite film obtained in this example is tetramethylethylenediamine (TEMED) incorporated sodium alginate film (SA+TEMED) or Composite 30.

Example 32

Preparation of Poly-L-Lysine Incorporated Sodium Alginate Film

To the preheated (90° C.) solution of sodium alginate (SA) from Urban Platter (1.0 g) in 20 mL, 0.019 in of cationic poly-L-lysine (pH=5-6) in 5 mL was added, to obtain a first mixture. The whole first mixture was stirred at 90° C. to mix well for 1 h. Later, the heated solution was poured into a petri dish and the solvent was slowly evaporated under an oven for 3 h to obtain a circular film, prior to characterization. The composite film obtained w this example is poly-L-lysine incorporated sodium alginate film (SA+Poly-L-lysine) or Composite 31.

Example 33

Preparation of Ammonium Chloride (Inorganic Ammonium Salt) Incorporated Seaweed Composite Film This present example explains the process of obtaining the composite having an inorganic ammonium salt. To the preheated (90° C.) solution of 0.5 gm of dry seaweed fiber powder (DSF) in 25 mL of water, 0.069 gm of ammonium chloride ($NH_4Cl$) in 5 mL of water was added, to obtain a first mixture. Then the whole first mixture was allowed to mix well at a temperature of 90° C. for 30 min and later, the heated solution was poured into a petri dish and then the solvent was slowly evaporated under an oven for 3 h to get circular transparent film prior to characterization. The composite film obtained in this example is ammonium chloride (inorganic ammonium salt) incorporated seaweed composite film or Composite 32. Although the process was carried out with an ammonium chloride (inorganic ammonium salt), however, it can be contemplated that a person skilled in the art can carry out the aforementioned process for obtaining composite having other inorganic ammonium salts, such ammonium acetate, ammonium nitrate, etc.

Example 34

Composite Films

The present example provides various composite films that were prepared in the Examples 1-33 of the present disclosure. Table 1 shows the components that are present in each composite film along with their respective weight percentages on a moisture free basis.

TABLE 1

| Composite (C) | Example (Ex) Number | Description of the Composite | Seaweed or seaweed extracts (wt. %) | Organic ammonium salt (wt. %) | Oleophilic component (wt. %) | Amphiphilic component (wt. %) | Plasticizer (wt. %) | Weight ratio of seaweed or its extract to organic ammonium salt |
|---|---|---|---|---|---|---|---|---|
| C1 | Ex-2 | SP | SP (100) | 0 | 0 | 0 | 0 | — |
| C2 | Ex-3 | SP + ChCl | SP (73) | Choline Chloride (27) | 0 | 0 | 0 | 2.7:1 |
| C3 | Ex-4 | SP + TRIS | SP (76) | TRIS (24) | 0 | 0 | 0 | 3.2:1 |
| C4 | Ex-5 | SP + TEMED | SP (87) | TEMED (13) | 0 | 0 | 0 | 6.6:1 |
| C5 | Ex-6 | SP + SDS + Ch.Cl + Gly | SP (46) | Choline Chloride (25) | 0 | SDS (17) | Glycerol (11) | 1.8:1 |

TABLE 1-continued

| Composite (C) | Example (Ex) Number | Description of the Composite | Seaweed or seaweed extracts (wt. %) | Organic ammonium salt (wt. %) | Oleophilic component (wt. %) | Amphiphilic component (wt. %) | Plasticizer (wt. %) | Weight ratio of seaweed or its extract to organic ammonium salt |
|---|---|---|---|---|---|---|---|---|
| C6 | Ex-7 | SP + CTAB + Ch.Cl + PO | SP (70) | CTAB (3.3) + Choline Chloride (20.7) | Palm oil (6) | 0 | 0 | 2.9:1 |
| C7 | Ex-8 | SP + CTAB + SPAN 80 | SP (45.3) | CTAB (2.2) | 0 | SPAN 80 (52.5) | 0 | 20.6:1 |
| C8 | Ex-9 | DSF-Powder | DSF-Powder (100) | 0 | 0 | 0 | 0 | — |
| C9 | Ex-10 | DSF-Film | DSF-Film (100) | 0 | 0 | 0 | 0 | — |
| C10 | Ex-11 | DSF + Ch.Cl | DSF (74) | Choline Chloride (26) | 0 | 0 | 0 | 2.8:1 |
| C11 | Ex-12 | DSF + TRIS | DSF (77) | TRIS (23) | 0 | 0 | 0 | 3.3:1 |
| C12 | Ex-13 | DSF + SDS + Ch.Cl + Gly | DSF (47) | Choline Chloride (25) | 0 | SDS (17) | Glycerol (11) | 1.9:1 |
| C13 | Ex-14 | DSF + CTAB + Ch.Cl + PO | DSF (70) | CTAB (3) + Choline Chloride (21) | Palm oil (6) | 0 | 0 | 2.9:1 |
| C14 | Ex-15 | DSF + PO | DSF (88) | 0 | Palm oil (12) | 0 | 0 | — |
| C15 | Ex-16 | DSF + CTAB + SPAN 80 | DSF (45.9) | CTAB (2.0) | 0 | SPAN 80 (52.1) | 0 | 22.9:1 |
| C16 | Ex-17 | DSF + Poly(L-lysine) | DSF (96.7) | Poly(L-lysine) (3.3) | 0 | 0 | 0 | 29.3:1 |
| C17 | Ex-18 | DSF + CTAB | DSF (95.2) | CTAB (4.8) | 0 | 0 | 0 | 20:1 |
| C18 | Ex-19 | DSF + TEMED | DSF (87) | TEMED (13) | 0 | 0 | 0 | 6.7:1 |
| C19 | Ex-20 | sp-DSF-Film | sp-DSF-Film (100) | 0 | 0 | 0 | 0 | — |
| C20 | Ex-21 | sp-DSF + Ch.Cl | sp-DSF (77) | Choline Chloride (23) | 0 | 0 | 0 | 3.3:1 |
| C21 | Ex-22 | sp-DSF + TRIS | sp-DSF (79) | TRIS (21) | 0 | 0 | 0 | 3.8:1 |
| C22 | Ex-23 | sp-DSF + SDS + Ch.Cl + Gly | sp-DSF 54 | Choline Chloride (24) | 0 | SDS (17) | Glycerol (5) | 2.2:1 |
| C23 | Ex-24 | sp-DSF + CTAB + Ch.Cl + PO | sp-DSF (77) | CTAB (3) + Choline Chloride (11) | Palm oil (9) | 0 | 0 | 5.5:1 |
| C24 | Ex-25 | sp-DSF + CTAB + Span 80 | sp-DSF (66.7) | CTAB (2.6) | 0 | Span 80 (30.7) | 0 | 25.65:1 |
| C25 | Ex-26 | SP + Ch.Cl | SP (48) | Choline Chloride (52) | 0 | 0 | 0 | 0.9:1 |
| C26 | Ex-27 | SP + CTAB | SP (51.2) | CTAB (48.8) | 0 | 0 | 0 | 1.05:1 |
| C27 | Ex-28 | SP + Ch.Cl + PO + SDS | SP (67) | Choline Chloride (24) | Palm oil (6) | SDS (3) | 0 | 2.8:1 |
| C28 | Ex-29 | DSF + TEMED + PO | DSF (81) | TEMED (12) | Palm oil (7) | 0 | 0 | 6.7:1 |
| C29 | Ex-30 | SA | SA (100) | 0 | 0 | 0 | 0 | — |
| C30 | Ex-31 | SA + TEMED | SA (87.3) | TEMED (12.7) | 0 | 0 | 0 | 6.9:1 |

TABLE 1-continued

| Composite (C) | Example (Ex) Number | Description of the Composite | Seaweed or seaweed extracts (wt. %) | Organic ammonium salt (wt. %) | Oleophilic component (wt. %) | Amphiphilic component (wt. %) | Plasticizer (wt. %) | Weight ratio of seaweed or its extract to organic ammonium salt |
|---|---|---|---|---|---|---|---|---|
| C31 | Ex-32 | SA + Poly-L-lysine | SA (98.14) | Poly-L-lysine (1.86) | 0 | 0 | 0 | 52.8:1 |
| C32 | Ex-33 | DSF + NH$_4$Cl | DSF (88) | NH$_4$Cl (12) | 0 | 0 | 0 | 7.2:1 |

Example 35

Measurement of Various Properties of the Seaweed Based Composite Films

Various properties of the seaweed based composite films of the present disclosure were measured and studied. The properties of the bioplastic an that were measured included moisture content, carbohydrate content, bound sulfate, elemental analysis (CHNS), water contact angle, water uptake ratio (WUR), water solubility (WS), tensile strength (TS), tear resistance (TR), % of elongation (% E), film thickness, GSM, and biodegradability, (a) Measurement of Moisture Content, Carbohydrate Content, Bound Sulfate, Elemental Analysis (CHNS)

Moisture content in the composite film was measured using a Sartorius MA 35 instrument at 110° C. The value is expressed as a percentage on a w/w basis. Carbohydrate content was measured by AOAC 986.25 (by difference). AOAC stands for Association of Official Analytical Collaboration. Bound sulfate was measured by digesting the composite material with 1.2 N hydrochloric acid at 90° C. for 3 h. The released sulfate was estimated using a spectrophotometric assay where the sulfate forms a precipitate with Barium chloride. The absorbance at 550 nm is proportional to the released (i.e. bound) sulfate, Elemental analysis was carried out using a CHNS analyser where high temperature combustion in an oxygen-rich environment is carried out to estimate the amount of C, H, N, and S.

(b) Measurement of Water Contact Angle

Water contact angle for all the composite films of the present disclosure (C1-C32) were measured by lab made set up equipped with USB digital microscope connected to a computer. For this purpose, a drop of controlled volume (10 mL) was deposited on the substrate, and the CA was measured at 0 s-10 s. The contact angle for each droplet was pleasured using chrome protractor plugin and the contour for each droplet was adjusted manually for accurate results. The contact angle was measured in degrees. At least 3 replicates were performed. Water contact angle above 65° C. was considered to be a characteristic of the aquaphobic film.

(c) Measurement of Water Uptake Ratio (WUR) and Water Solubility (WS)

(i) Water uptake ratio (WUR): All the composite films (size 2×2 cm) were dried overnight, weighed and then immersed into water for 5 min. The films were then taken out, wiped to remove excess water and weighed. The weight of the composite films was taken before and after which the composite films were immersed into water. The water uptake ratio (WUR) was estimated using the following formulas WUR (%)=100×($mt-mo$)/$mo$ Where mo and mt rare the weight of the samples before and after the immersion, respectively.

(ii) Water Solubility (WS): All the composite films (size 2×2 cm) of the present disclosure were weighed along with the vial and then dipped into 10 mL of water. After 6 hours, the water was removed carefully, and the insoluble solid mass was dried. The mass of the films was taken before and after dipping into water. The water solubility was estimated using the following formula:

WS (%)=100×($S-S0$)/$S0$

Where S0 is the weight of dry Solids and S is the weight of dry solid that remains undissolved after 6 hours in water at an ambient temperature (d) Measurement of Mechanical Properties Mechanical properties of the composite films, such as tensile strength, % elongation, and tear resistance were measured using a texture analyser. Samples of dimensions of 3 cm×6 cm were cut and used. The composite films were subjected to mechanical strain and fractured. At least 3 replicates were performed in the present experiment. Film thickness was measured in triplicates using a precision micrometer. GSM was calculated based on the average weight of triplicate 5×5 cm films.

(e) Measurement of biodegradability of films

Biodegradability of films was measured by placing them within (buried) or on the top of garden soil for a period of several weeks. The amount of the leftover films was measured at regular intervals and was plotted versus the degradation time.

Example 36

Role of the Organic Ammonium Salt in Tuning the Aquaphobicity of the Composite Film In the present disclosure, the presence of the organic ammonium salt is critical tor arriving at the composite. The presence of the organic ammonium salt, in the absence of a hydrogen bond donor, helps in obtaining the composite films that exhibits an enhanced aquaphobicity. The present example demonstrates the effect of the incorporating various types of organic ammonium salts in tuning the aquaphobicity of the composite. The aquaphobicity of the composite or of the constituent components was assessed by measuring the following parameters: (a) water contact angle, and/or (b) water uptake ratio, and/or (c) water solubility. It is noteworthy to mention here that the composite film which has the enhanced aquaphobicity should have either higher water contact angle (especially above 65°) and/or lower water uptake ratio and/or lower water solubility with respect to the seaweed component.

Table 2 shows the water contact angle (WCA), water uptake ratio (WUR), and water solubility (WS) of the composite films comprising various organic ammonium salts.

TABLE 2

| S. No. | Composite (Example Number) | Water Contact Angle (WCA) | Water uptake ratio (WUR) | Water Solubility (WS) |
| --- | --- | --- | --- | --- |
| 1 | C9 (Ex-10) | 28.1 | 1057.56 | 55.90 |
| 2 | C10 (Ex-11) | 58.0 | 700.48 | 32.63 |
| 3 | C11 (Ex-12) | 42.8 | 582.82 | 63.88 |
| 4 | C12 (Ex-13) | 52.9 | 510.33 | 79.73 |
| 5 | C16 (Ex-17) | 71.3 | 898.72 | 42.93 |
| 6 | C18 (Ex-19) | 74.2 | 796.19 | 51.88 |
| 7 | LDPE | 88.3 | 0 | 0 |

Referring to Table 2, seaweed composite Film comprising various types of ammonium salts were compared with Low-density polyethylene (LDPE) using all three parameters (water contact angle (WCA), water uptake ratio (WUR), and water solubility (WS) and the results are shown in FIG. 4. As shown in Table 4 and FIG. 4(b), the composite C9 (obtained in Ex-10) comprising only dry seaweed fiber powder (DSF) had the lowest water contact angle of 28:1° and highest water uptake ratio of 1057.56%, in contrast, the composite C10 (DSF+Ch.Cl; obtained in Ex-11) to comprising the DSF (74%) and Choline Chloride (26%) had a relatively higher water contact angle of 58.0°. Similarly, the presence of the organic ammonium salts, such as, TRIS (23%), Choline Chloride (25%), poly-L-Lysine (3.3%), TEMED (13%), in the DSF based composites C11 (DSF+TRIS), C12 (DSF+SDS+Ch.Cl+Gly), C16 (DSH-Poly(L-lysine)), C18 (DSF-TEMED), respectively, exhibited better water contact angles as compared to the DSF composite C9 without any organic ammonium salt. As it evident from FIGS. 4(a) and 4(b), upon adding the organic ammonium salts in the DSF based composite films, the water contact anele increased from 28.1° to 74.2°.

Furthermore, out of all the DSF composites as shown in Table 2, it was also observed that the DSF composite films, C16 and C18 having poly-L-Lysine and TEMED as organic ammonium salts, respectively, showed the highest water contact angle of 71.3°, and 74.2°, respectively.

The same results were also reflected in WUR and WS measurements as shown in FIGS. 4(c) and 4(d) where, WUR value of the DSF composite film C9 without organic ammonium salt was higher than organic ammonium salts incorporated DSF composite films, such as C10 (DSF+Ch.Cl), C11 (DSF+TRIS), C12 (DSF+SDS+Ch.Cl+Gly), C16 (DSF+Poly(L-lysine)), and C18 (DSF+TEMED). Moreover, the WS value (32.63%) of the C10 (DSF+Ch.Cl) was lower than the WS value (55.90%) of DSF composite film C9.

The above results as demonstrated in Table 2, FIG. 4, indicates that the presence of the organic ammonium salt in the disclosed weight percentage range (1-45%) is crucial for arriving at the composite film with an enhanced aquaphobicity, Thus, it can be inferred that the absence of the organic ammonium salt in the composite film does not show the desired aquaphobicity.

Example 37

Effect of Adding Organic Ammonium Salt in Seaweed Based Composite Film Comprising Oleophilic Component The example demonstrates the effect of adding, organic ammonium salt in the seaweed based composite films comprising oleophilic component. It is pertinent to mention here that the combination of organic ammonium salt and oleophilic component in the composite film shows an enhanced aquaphobicity as compared to the composite film comprising only oleophilic component. The aquaphobicity of seaweed composite films was assessed by measuring the important parameters such as water contact, angle, water uptake ratio (WUR), and water solubility (WS).

Table 3 shows the comparison of the aquaphobicity of the seaweed based composite film comprising oleophilic component with and without organic ammonium salts.

TABLE 3

| S. No. | Composite Example Number) | Water Contact Angle (WCA) | Water uptake ratio (WUR) | Water Solubility (WS) |
| --- | --- | --- | --- | --- |
| 1 | C9 (Ex-10) | 28.1 | 1057.56 | 55.90 |
| 2 | C13 (Ex-14) | 25 | 646.05 | 36.69 |
| 3 | C14 (Ex-15) | 73.1 | 1309.66 | 51.36 |
| 4 | LDPE | 88.3 | 0 | 0 |

Referring to Table 3 and FIG. 5(a), it can be observed that although the water contact angle (73.1°) of the seaweed based composite C14 (DSF+PO) was higher than the water contact angle (25°) of the composite Film C13 (DSF+CTAB+Ch.Cl+PO), however, it can be observed from FIG. 5(b) that the palm oil (oleophilic component) phase separated out and formed oily droplets on the surface of the composite film C14, Even though the water contact angle of the composite film C13 (DSF+CTAB+Ch.Cl+PO) was substantially lesser as compared to the water contact angle of C14 due to the surfactant nature of CTAB as shown in to FIG. 5(a), but the palm oil was observed to be incorporated the composite film C13 and thus was not phase separated out. Moreover, the water uptake ratio (646.05%) and water solubility (36.69%) values of the DSF composite C13 comprising a combination of Choline chloride (21%)+CTAB (3%)+Palm oil (6%) were lower than the water uptake ratio (1309.66%) and water solubility (51.36%) of the seaweed composite film C14 comprising only palm oil, as also shown in FIG. 5(c) and FIG. 5(d), respectively, Referring to Example 29, i.e. composite film C28 (DSF+TEMED+PO) comprised DSF (81%), organic ammonium salt (TEMED) which is non surfactant in nature (12%), and an oleophilic component (palm oil, 7%). In this composite C28, it was found that the presence of TEMED prevents the phase separation of palm oil in this composite. In addition, due to the non-surfactant nature of TEMED, the water contact angle of C28 was 52.3°, which i was higher than the water contact angle (28.1°) of the composite C9 (DSF-film), as well as the water contact angle (25°) of the composite film C13 (DSF+CTAB+Ch.Cl+PO). Furthermore, the water uptake ratio of composite film C28 was 160.6%, which was much lower than that of C9, C13 and C14. It can be inferred that that using a non-surfactant organic ammonium facilitated sufficiently high water contact angle, and very low water uptake ratio, while also incorporating palm oil.

Therefore, it can be inferred from Table 3, FIG. 5 and composite film C28, that the aquaphobicity of the seaweed film having oleophilic component is considerably increased only upon the incorporation of organic ammonium salts in the composite, as measured by at least one metric of aquaphobicity. Hence, the presence of the organic ammonium salt in the disclosed weight percentage range (1-45%) along with the oleophilic component in the disclosed weight range (5-15%) is important for arriving at the composite that shows an enhanced aquaphobicity.

Example 38

Evaluation of Aquaphobicity with Incorporation of Organic Ammonium Salts and/or Oleophilic Component and/or Amphiphilic Component in Dry Spinosum Seaweed Fiber (sp-DSF) Composite Films The aquaphobicity of the dry spinosum seaweed fiber (sp-DSF) composite films was evaluated by incorporation of various organic ammonium salts and/or oleophilic components and/or amphiphilic components by measuring important parameters, such as, water contact angle, water uptake ratio and water solubility as shown in FIG. 6, Table 4 shows the effect of adding organic ammonium salt in the dry spinosum seaweed fiber (sp-DSF) composite on aquaphobicity.

TABLE 4

| S. No. | Composite (Example Number) | Water Contact Angle (WCA) | Water uptake ratio (WUR) | Water Solubility (WS) |
|---|---|---|---|---|
| 1 | C19 (Ex-20) | 10.7 | 519.05 | 72.92 |
| 2 | C20 (Ex-21) | 25.1 | 283.87 | 62.28 |
| 3 | C21 (Ex-22) | 9.2 | 299.36 | 76.21 |
| 4 | C22 (Ex-23) | 46.7 | 228.56 | 60.15 |
| 5 | C23 (Ex-24) | 6.7 | 241.33 | 49.00 |
| 6 | C24 (Ex-25) | 37.3 | 171.67 | 43.61 |
| 7 | LDPE | 88.3 | 0 | 0 |

Referring to Table 4 and FIG. 6(a) and FIG. 6(b), it can be observed that the dry spinosum seaweed fiber film C19 (sp-DSF-Film) had the lowest water contact angle of 10.7°. However, it can be appreciated that after the addition of organic ammonium salt, such as CTAB (23%) in the composite film C24 comprising 30.7% of Span 80 (amphiphilic component), the water contact angle increased to 37.3°. Therefore, it can be inferred that the water contact angle of the sp-DSF composite film comprising organic ammonium salt and amphiphilic component can drastically increase from 10.7° to 46.7° (for composite C22 (sp-DSF+SDS+Ch.Cl+Gly), where Choline chloride is the organic ammonium salt and SDS is the amphiphilic component), which indicates the enhanced aquaphobicity of the composite film.

The composite films C20, C21, C22, C23, and C24 showed better aquaphobic characteristics with lower WUR values and in some cases lower WS values as well. As shown in FIG. 6(c) and FIG. 6(d), the WUR (241.33%) and WS (49%) values of the composite C23 (sp-DSF+CTAB+Ch.Cl+palm oil) comprising 11% of choline chloride (organic ammonium salt) 3% of CTAB (organic ammonium salt), and 9% of palm oil (oleophilic component) was lower than the WUR (519.05%) and WS (72.92%) values of the composite C19 (sp-DSF), indicating the enhanced aquaphobicity of the composite C23.

Example 39

Evaluation of Aquaphobicity with Incorporation of Organic Ammonium Salts and/or Oleophilic Compounds and/or Amphiphilic Compounds in Seaweed Polysaccharide (SP) Composite Films The aquaphobicity of the seaweed polysaccharide (SP) composite films was evaluated by incorporation of various organic ammonium salts and/or oleophilic components and/or amphiphilic components by measuring important parameters, such as, water contact angle, water uptake ratio and water solubility as shown in FIG. 7. Table 5 shows the effect of adding organic ammonium salts in the dry seaweed polysaccharide films (SP) composite on aquaphobicity.

TABLE 5

| S. No. | Composite (Example Number) | Water Contact Angle (WCA) | Water uptake ratio (WUR) | Water Solubility (WS) |
|---|---|---|---|---|
| 1 | C1 (Ex-2) | 36.5 | 1324.56 | 44.32 |
| 2 | C2 (Ex-3) | 66.1 | 627.48 | 65.31 |
| 3 | C3 (Ex-4) | 63.5 | 1412.50 | 92.99 |
| 4 | C5 (Ex-6) | 39.8 | 633.24 | 71.92 |
| 5 | C6 (Ex-7) | 46.1 | 428.09 | 60.15 |
| 6 | C7 (Ex-8) | 17.9 | 416.05 | 29.77 |
| 7 | LDPE | 88.3 | 0 | 0 |

Further, referring to Table 5 and FIG. 7(a) and FIG. 7(b), the composite C1 (SP film) had a water contact angle of 36.5°. However, it can be appreciated that the water contact angle of the SP composite films, such as, C2 (SP+Choline Chloride), C3(SP+TRIS), and C6 (SP+CTAB+Ch.Cl+PO) was increased after the addition of organic ammonium salts, such as 27% of choline chloride, 24% of TRIS, and CTAB Choline chloride (24%), respectively in the C2, C3, and C6 composites, Therefore, the water contact angle measurement shows that water contact angle of the SP composite film comprising organic ammonium salts in the disclosed weight percentage range 0-45%) was drastically increased from 36.5° to 66.1°, indicating the enhanced aquaphobicity. Further, as shown in FIG. 7(c), all the SP composite films C2, C5, C6, C7 having organic ammonium salts, and/or oleophilic compounds, and or amphiphilic compounds had lower WUR than the C1 (SP film) without any organic ammonium salt. It can also be appreciated that the composite C7 (SP+CTAB+SPAN 80) had the lowest WS value (29.27%) as compared to that of C1. Therefore, it can be inferred from FIG. 7(d) that the combination of organic ammonium salt and amphiphilic component decreased the WS of the SP composite films further.

Further, the water contact angle of the composite film C27 (SP+Ch.Cl+PO+SDS) having 24% of choline chloride (organic ammonium salt), 6% of palm oil (oleophilic component) and 3% of SDS (amphiphilic component) was compared with the water contact angle of the SP composite film C1, and it was found that the water contact angle of C27 was 42.7°, which was higher than that of the SP composite film C1 (36.5°).

It can be inferred from the above results that the aquaphobicity of the seaweed film is considerably increased by the incorporation of organic ammonium salt and/or oleophilic compounds, and/or amphiphilic, as measured by at least one metric of aquaphobicity. Thus, these results clearly indicate that the presence of the organic ammonium salt in the disclosed weight percentage range (145%) in the composite film is essential for tuning and enhancing the aquaphobicity of the composite films.

Example 40

Role of Cationic Organic Ammonium Salt for Better Incorporation of Oleophilic Components into Seaweed Polysaccharide Films Oleophilic components were incorporated into the seaweed polysaccharide composite film to obtain the composite films with enhanced aquaphobicity by slowly blending the oleophilic components into the seaweed polysaccharide solutions at 90° C. However, it was found that oleophilic components started to phase separate from the seaweed polysaccharide composite films, as shown FIG. 5(b)). To immobilize the oleophilic components into these composite films, various cationic, anionic and non-ionic surfactants (amphiphilic component) were employed along with cationic organic ammonium salts. Surprisingly, it was found that the oleophilic components could be incorporated into seaweed polysaccharide composite films only upon using cationic surfactants or cationic organic ammonium salt (composite film C28, for example) whereas oleophilic compounds were found to be phase separated from those seaweed polysaccharide composite films that used anionic and non-ionic surfactants.

Example 41

Evaluation of aquaphobicity incorporation of organic ammonium salts in sodium alginate (brown seaweed extract) based composite films The aquaphobicity of seaweed polysaccharide derived how brown seaweed, i.e., sodium alginate (SA) wits compared with the aquaphobicity of SA based films comprising organic ammonium salts, for instance, C30 and C31. For the purpose of comparing the aquaphobicity, the water contact angle of the composite film was calculated based on the method described in Example 35. The water contact angle of the composite C29 (SA) was 45.1°, whereas, the water contact angle of the composite C30 comprising 12.7% of TEMED (organic ammonium salt) was 67.7°, and the water contact angle of C31 comprising 1.86% of Poly-L-lysine, was 69.2° The water uptake ratio of the composite C29 (SA) was 440%, whereas, the water contact angle of the composite C30 comprising 12.7% of TEMED (organic ammonium salt) was only 195%, and the water contact angle of C31 comprising 1.86% of Poly-L-lysine, was 204%. Therefore, it can be inferred that with the addition of the organic ammonium salt in the disclosed weight ranges, the aquaphobicity of the composite film also increases.

Example 42

Biodegradability of the Seaweed Based Composite Films

The biodegradability of the seaweed based composite films was assessed by preparing films with various composites, such as, C1, C2, C3, C5, C6, and C7. The composite films were then subjected to a compostability study for over several weeks. FIG. 8(a) shows the percent (%) degradation of the aforementioned composite films when buried in the garden soil under ambient conditions, and their % degradation was compared with orange peel (OP) and low-density polyethylene plastic (LDPE). The biodegradability of the aforementioned composites is tabulated in Table 6 below, Referring to Table 6, and FIG. 8(a), it can be observed that the LDPE did not degrade at all, whereas, the degradation of the various seaweed based composite films, such as, C1, C2, C3, C5, C6, and C7 was comparable to that of orange peel (OP) or was even better. It was observed from FIG. 8(a) that the rate of degradation of the composite films comprising organic ammonium salts, such as 27% of Choline chloride in C2, 24% of TRIS in C3, 25% of choline chloride in C5, 24% of a combination of choline chloride and CTAB in C6, and 2.2% of CTAB in C7, was comparable to that of orange peel or even better. Therefore, incorporation of the to organic ammonium salts, and/or oleophilic components and/or amphiphilic components preserves the biodegradability of the composites.

Similarly, FIG. 8(b) shows the degradation of the seaweed based composite films when left on the surface of the garden soil. In both the studies, it was observed that 50% or more of the material was degraded in 90 days. It was found that due to the increased aquaphobicity of some of the composite films comprising organic ammonium salts, such as C2, C5, C6, and C7, the rate of degradation was lower than that of the film with seaweed raw material alone, i.e., composite C Nevertheless, they were comparable in biodegradability to orange peel. In addition, the biodegradability of the aforementioned composite films C2, C5, C6, and C7 can be tuned depending on the conferred aquaphobicity of the composite films of the present disclosure.

Example 43

Characterization of the Seaweed Based Composites Fourier-transform Infrared Spectroscopy (FT-IR) Spectroscopic Analysis Finely powdered seaweed polysaccharide composite materials were characterized with transmission. Fourier-transform infrared spectroscopy (FT-IR) on a Shimacki spectrometer (Thermo Scientific, USA) in the range 4500-450 $cm^{-1}$. Spectra of seaweed polysaccharide (SP; C1), C2 (SP+Ch.Cl) composite film and SP+CTAB composite film were obtained with KBr pellet. The FTIR spectra is illustrated in FIG. 2, The FTIR spectrum of SP exhibited a broad absorption peak centered at 3421 $cm^{-1}$, corresponding to the OH stretching vibration. The characteristic bands of SP occurred at 1243 $cm^{-1}$ and 848 $cm^{-1}$, attributed to the O=S=O and O—$SO_3$ stretching vibration frequency at the C-4 position of galactose, respectively. The peaks at 1050 and 1138 $cm^{-1}$ represented the C—O stretching frequency. The characteristic of the C—O—C vibration frequency of the 3,6-anhydro-D-galactose residue peak appeared at 929 $cm^{-1}$. The peaks corresponding to C—O—H in-plane bending vibration and bending vibration appeared at 1411 $cm^{=-1}$ and 1376 $cm^{-1}$, respectively. The strong signal at 1575 $cm^{-1}$

TABLE 6

| S. No. | Composite No. of days | % Degradation (buried) vs days | | | | | % Degradation (surface) vs days | | | | |
|---|---|---|---|---|---|---|---|---|---|---|---|
| | | 0 d | 30 d | 45 d | 60 d | 90 d | 0 d | 30 d | 45 d | 60 d | 90 d |
| 1 | C1 (Ex-2) | 100 | 62.25 | 0 | 0 | 0 | 100 | 70.9 | 50.46 | 22.18 | 16.88 |
| 2 | C2 (Ex-3) | 100 | 66.49 | 75.38 | 36.89 | 28.43 | 100 | 79.77 | 76.1 | 50.7 | 40.53 |
| 3 | C3 (Ex-4) | 100 | 5.53 | 3.04 | 0 | 0 | 100 | 33.46 | 8.7 | 3.14 | 0 |
| 4 | C5 (Ex-6) | 100 | 68.5 | 60.75 | 41.85 | 29.9 | 100 | 79.53 | 77.71 | 51.42 | 44.03 |
| 5 | C6 (Ex-7) | 100 | 54.86 | 39.79 | 24.75 | 21.06 | 100 | 78.67 | 75.21 | 53.33 | 56.19 |
| 6 | C7 (Ex-8) | 100 | 67.6 | 67.72 | 40.65 | 38.6 | 100 | 87.15 | 90.26 | 58.79 | 48.22 |
| 7 | LDPE | 100 | 100 | 100 | 100 | 100 | 100 | 100 | 100 | 100 | 100 |
| 8 | OP | 100 | 25.08 | 39.97 | 26.75 | 16.39 | 100 | 54.03 | 25.9 | 24.45 | 23.34 | represented the absorption band of $H_2O$. In case of modified SP with choline chloride or CTAB, the characteristic bands of typical charged amines derivatives were observed at 3247 cm$^{-1}$ and 1660 cm$^{-1}$ which represented the n(NH$_3^+$) vibrations and deformation vibrations d(NH3$^+$). It indicated the incorporation of ammonium derivatives. The peaks of SP+Ch.Cl and SP+CTAB appeared in the region of 942-950 cm$^{-1}$ that indicated the identity of ammonium structure of ammonium compounds. Furthermore, FT-IR spectra of SP+Ch.Cl and SP+CTAB described that there was a shift in the O=S=O and O—SO$_3$ stretching vibration as compared to the spectrum of SP which indicated the interaction between the SO$_3$ group and ammonium compounds. The shift in the peaks corresponded to specific functional groups that showed the formation of a complex that was distinct from the initial raw materials.

Example 44

Thermogravimetric Analysis of the Seaweed-based Composites

Thermogravimetric analysis (TGA) was carried out to study the thermal stability or thermal degradation characteristic of the SP and SP+CTAB composite materials by using Perkin-Elmer STA6000. All the composite materials were winded to fine powder prior to TGA measurements and the tests were performed on ceramic pan under 100 mL/min airflow, in the temperature range of 35-800° C. at a heating rate 20° C./min. FIG. 3(a) depicts the comparison of the TGA profile of the seaweed polysaccharide composite material, and SP+CTAB, and FIG. 3(b) depicts the TGA profile of CTAB. This shows that the thermal decomposition temperature of CTAB is at 280° C. and that it undergoes degradation in a single step. As shown in FIG. 3, the TGA profile of SP-CTAB exhibited the two major degradation steps along with better improvement in the thermal stability as compared to SP (C1). This was due to the incorporation of CTAB (organic ammonium salt) in the composite. The increase in thermal stability demonstrated the formation of a complex that was distinct from the initial raw materials. Therefore, it can be inferred that the presence of organic ammonium salt in the composite is crucial for formation of ionic, covalent and/or coordinate covalent interactions that help to increase the thermal stability of the composite.

Example 45

Properties of the Bioplastic Film (Article) Comprising the Composites of the Present Disclosure Various properties of the bioplastic film were measured and studied. Table 7 shows the properties of the bioplastic film that were studies and measured.

TABLE 7

| S.No. | Bioplastic Film comprising composite (C) | Thickness (microns) | GSM | Moisture content (%) | Tensile Strength (MPa) | % Elongation | Tear Resistance (kN/m) |
|---|---|---|---|---|---|---|---|
| 1 | C1 (SP) or C9 (DSF-Film) | 75 | 100 | 15 | 30 | 4 | 350 |
| 2 | C2 (SP + Ch.Cl) or C10 (DSF + Ch.Cl) | 75 | 130 | 30 | 5 | 20 | 90 |
| 3 | C5 (SP + SDS + Ch.Cl + Gly) or C12 (DSF + SDS + Ch.Cl + Gly) | 125 | 250 | 10 | 13 | 15 | 130 |
| 4 | C6 (SP + CTAB + Ch.Cl + PO) or C13 (DSF + CTAB + Ch.Cl + PO) | 75 | 200 | 25 | 8 | 20 | 80 |
| 5 | C7 (SP + CTAB + Span 80) or C15 (DSF + CTAB + SPAN 80) | 125 | 180 | 30 | 4 | 42 | 40 |
| 6 | C20 (sp-DSF + ChCl) | 140 | 270 | 12 | 9 | 8 | 110 |
| 7 | C22 (sp-DSF + SDS + ChCl + Gly) | 220 | 450 | 17 | 2.5 | 22 | 30 |
| 8 | C23 (sp-DSF + CTAB + ChCl + PO) | 140 | 220 | 6 | 5 | 18 | 105 |
| 9 | C23 (sp-DSF + CTAB + SPAN80) | 240 | 350 | 6 | 8 | 9 | 100 |
| 10 | LDPE | 50 | 40 | 0 | 12 | 80 | 750 |

The properties of different bioplastic films comprising the biodegradable composite having varied components were compared with the properties of Low-density polyethylene (LDPE) as shown in Table 7, The SP based composite films (C1) had a much higher tensile strength (mechanical strength) than LDPE but had a very low % elongation. It can be appreciated that that by adding organic ammonium salt in the SP based composites, the plasticity of the SP films prepared from said organic ammonium incorporated SP based composites, was improved with an increase in elongation while maintaining the tensile strength within acceptable limits.

Example 46

Comparative Examples (a) Comparative Example 1: This example demonstrates the importance of having the seaweed or seaweed extract to the organic ammonium salt in the weight ratio range of 1.2:1 to 53, to arrive at the composite of the present disclosure with desired aquaphobicity.

As described in Example 3 of the present disclosure, the composite C2 comprising 73% of seaweed polysaccharide (SP) and 27% of choline chloride (organic ammonium salt) was prepared, wherein the weight ratio of the seaweed polysaccharide SP to choline chloride was 2.7:1 (Table 1). The water contact angle of the composite C2 was 66.1°. Further, as described in Example 26, the composite C25 comprising 48% of SP and 52% of choline chloride was prepared, wherein the is weight ratio of the seaweed polysaccharide SP to choline chloride was 0.9:1. It was observed that the composite C25 not only had poor film stability, but the water contact angle of this composite film was 32.8° which was similar to that of the seaweed polysaccharide film (composite C1) having water contact angle of 36.5°. Similar to the C25, the composite C26 comprising 51.2% of SP and 48.8% of CTAB, was prepared according to the process described in example 27 of the present disclosure, wherein the weight ratio of SP to CTAB was 1.05:1. In this case, it was observed that the composite C25 formed a fiber-like product which did not form a film indicating that it has a very poor mechanical stability, Therefore, it can be inferred that the presence of seaweed polysaccharide SP to choline chloride in the disclosed weight percentage range (1.2:1 to 53:1) is crucial for arriving at the composite which has better aquaphobicity and mechanical stability.

b) Comparative Example 2: This example provides a comparison between the aquaphobicity of the seaweed based composite films comprising organic ammonium salt and inorganic ammonium salt.

For this purpose, the composite. C32 comprising 88% of DSF and 12% of ammonium chloride (inorganic ammonium salt) was obtained by the process as described in Example 33. The water contact angle of composite C32 was observed to be 27.4°, which was similar to that of the film prepared from DSF (C9) having water contact angle 28.1. In contrast, the water contact angle of the composite films, such as C16 (DSP-Poly(L-lysine)), and C18 (DSF+TEMED), was 71.3° and 74.2°. The water solubility of composite C32 was observed to be 64.5%, which was even higher than the film prepared from DSF (C9) having water solubility of 55.9%. In contrast, the water solubility of the composite films such as C10 (DSF+Ch.Cl) and C16 (DSF+Poly(L-lysine)) was 32.63% and 42.93%. The above results clearly indicate that composite having organic ammonium salts shows enhance aqauphobicity properties as compared to the composite comprising inorganic ammonium salts.

Although the examples of the present disclosure are illustrated with the film/bioplastic film (article) comprising composites of the present disclosure, however, similar results would be obtained if a person skilled in the art uses the composite of the present disclosure to prepare other articles selected from the group consisting of thermoformed inserts, sheets, sachets for both dry and wet materials, laminates, banners, loose fill for packaging secondary packaging, bubble wrap, coatings, inner lining for cardboard boxes, multilayer films with at least one of the layers comprising the composite, blister packs, boxes, waste collection bags, shopping bags, bottles, trays, cups, lids, nettings, tubs for produce, pouches, jars, tunes, teabags, capsules, plates straws, spoons, forks, food wraps, agricultural mulch films, plant pots, seed strips, twine, ties, clips, tapes, thread, gloves, masks, gowns, plastic replacement for electronics, automobile, aerospace, houseware, and textiles.

Moreover, the article comprising the composites of the present disclosure can be mixed with an additive selected from the group consisting of jute, cotton, flax fiber, silk, wool, linen, paper, wood pulp, agricultural waste, food waste, vegetable waste, bagasse, cardboard waste, natural rubber, celluloses, starches, chitin, chitosan, gelatin, guar gum, kapaya gum, gum tragacanth, collagen, hyaluronic acid, pectin, locust bean gum, pullulan, xanthan gum, gellan gum, galactomannan gum, gum arabic, gum acacia, gum ghatti, milk proteins, egg proteins, vegetable proteins, xyloglucan, curdlan, dextran, beta-glucans, arabinoxylans, inulin, konjac glucomannan, polylactic acid, polyvinyl alcohol, polyhydroxybutyrate, polyhydroxyalkanoate, polybutylene succinate, polycaprolactone, and polybutylene adipate terephthalate. FIG. 9 depicts a few of the articles, such as (a) a sandwich food wrap, (b) a pouch, (c) a heat sealable sachet that are prepared from the seaweed based composites of the present disclosure.

Overall, it can be observed that the presence of the organic ammonium is crucial for arriving at the composite comprising: at least one seaweed or seaweed extract; and at least one ammonium salt, wherein the ammonium salt is an organic ammonium salt, of the present disclosure. Apart from the presence of the organic ammonium salt in the disclosed weight percentage range of 1-45%, the presence of the seaweed or seaweed extract to the ammonium salt in the weight ratio range of 1.2:1 to 53:1 is equally important for arriving at the composite with desired aquaphobicity properties, mechanical properties, and biodegradability. An deviation in the weight percentage range (1-45%) of the organic ammonium or the weight ratio range (1.2:1 to 53:1) of seaweed or seaweed extract to the ammonium salt as in the case of the composites C25, and C26 having organic ammonium salt at a weight percentage of 52%, and 48.8%, respectively, fails to provide the composite with desired properties. Moreover, the absence of organic ammonium salt as in the case of composite C1, C9, C14, and C19 fails to exhibit the desired properties. Also, by replacing the organic ammonium salt with the inorganic ammonium salt as in the case of C32 fails to provide the composite with desired characteristic properties. Therefore, the composites C1, C9, C14, C19, C25, C26, and C32 are considered as non-working composites of the present disclosure.

Advantages of the Present Disclosure

The present disclosure disclose a composite comprising: (a) at least one seaweed or seaweed extracts; and (b) at least one organic ammonium salt. The composite also comprises at least one component selected from the group consisting of at least one oleophilic component, at least one amphiphilic component, and combinations thereof. The presence of the organic ammonium salt in the disclosed weight percentage range of 1-45% on a moisture free basis, and the presence of seaweed or seaweed extracts to the organic ammonium salt in the disclosed weight ratio range of 1.2:1 to 53:1 facilitate enhanced and tunable aquaphobicity. The composite as disclosed in the present disclosure is a biodegradable composite that can molded and extruded into various shapes so as to obtain a biodegradable article, including but not limited to films, bioplastic films, thermoformed inserts, sheets, sachets for both dry and wet materials, laminates, banners, loose fill for packaging, secondary packaging, bubble wrap, coatings, inner lining for cardboard boxes, multilayer films with at least one of the layers comprising the composite, blister packs, boxes, waste collection bags, shopping bags, bottles, trays, cups, lids, nettings, tubs for produce, pouches, jars, tunes, teabags, capsules, plates, straws, spoons, forks, food wraps, agricultural mulch films, plant pots, seed strips, twine, ties, clips, tapes, thread, gloves, masks, gowns, plastic replacement for electronics, automobile, aerospace, houseware, and textiles, etc., and is envisaged as a wholesome replacement for fossil fuel-based plastics or bio-based plastics based on raw materials from land plants. The presence of the at least one organic ammonium salt is important for tuning the aquaphobicity and mechanical stability of the bioplastic films, and a biodegradable article comprising the biodegradable composite. In addition to the at least one organic ammonium salt, the presence of at least one oleophilic component, at least one amphiphilic component, and combinations thereof can be used for further improvement in the performance of bioplastic films and the biodegradable article. Therefore, the bioplastic film and biodegradable article have excellent properties including printability, opacity, or transparency as required, heat sealing, tolerance to both water-based materials and oil-based materials, mechanical strength, aquaphobicity. The present disclosure also provides a greener, robust process that uses mild reaction conditions to prepare the biodegradable composite of the present disclosure. Overall, the present disclosure provides a cost-effective, environment-friendly, and biodegradable composite that can decompose naturally in the environment, which is vital for avoiding pollution.

We claim:
1. A composite, comprising:
  a) at least one seaweed or seaweed extract in a weight percentage of at least 15% with respect to the composite on a moisture-free basis; and
  b) at least one organic ammonium salt selected from the group consisting of a primary, secondary, and tertiary ammonium salt, wherein the organic ammonium salt has a weight percentage in the range of 1-6.0% with respect to the composite on a moisture-free basis, and the organic ammonium salt is selected from the group consisting of: ammonium salt of tris(hydroxymethyl) aminomethane (TRIS), ammonium salt of alkylamines, ammonium salt of dialkylamines, ammonium salt of glutamine, ammonium salt of asparagine, ammonium salt of arginine, ammonium salt of lysine, ammonium salt of histidine, ammonium salt of polylysine, ammonium salt of polyarginine, ammonium salt of polyhistidine, ammonium salt of polyethylenimine, ammonium salt of polyethylamine, derivatives thereof, and combinations thereof;

wherein, said composite does not comprise urea and wherein the organic ammonium salt forms ionic, covalent and/or coordinate covalent interactions with the seaweed or seaweed extract forming a complex.

2. The composite as claimed in claim 1, wherein the composite further comprises at least one component selected from the group consisting of an oleophilic component and an amphiphilic component.

3. The composite as claimed in claim 1, wherein the seaweed or seaweed extract to the organic ammonium salt weight ratio is in the range of 13:1 to 53:1.

4. The composite as claimed in claim 1, wherein the seaweed or seaweed extract has a weight percentage in a range selected from the group consisting of: 40-99% with respect to the composite on a moisture-free basis, 43-98% with respect to the composite on a moisture-free basis, 55-95% with respect to the composite on a moisture-free basis, and 65-90% with respect to the composite on a moisture-free basis, and wherein the ammonium salt has a weight percentage in a range selected from the group consisting of 1-5% with respect to the composite on a moisture-free basis, and 1-3.5% with respect to the composite on a moisture-free basis.

5. The composite as claimed in claim 2, wherein the oleophilic component has a weight percentage in a range selected from the group consisting of: 5-15% with respect to the composite on a moisture free basis, 5-12% with respect to the composite on a moisture-free basis, and 6-10% with respect to the composite on a moisture-free basis, or wherein the amphiphilic component has a weight percentage in a range selected from the group consisting of: 2-53% with respect to the composite on a moisture free basis, 10-45% with respect to the composite on a moisture-free basis, and 15-35% with respect to the composite on a moisture-free basis.

6. The composite as claimed in claim 1, wherein the seaweed or seaweed extract is selected from the group consisting of *Kappaphycus striatus, Eucheuma cottonii, Eucheuma denticulatum, Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria sp., Gigartina skottsbergii, Gelidium amansii, Gracilaria dura, Gracilaria gigas, Furcellaria sp., Sargassum sp., Ascophyllum sp., Kelp, Saccharina sp., Laminaria sp., Asparagopsis sp., Ulva sp.,* kappa-carrageenan, iota-carrageenan, lambda-carrageenan, alginate, agar, and ulvan.

7. The composite as claimed in claim 2, wherein the oleophilic component is selected from the group consisting of vegetable oils, palm oil, essential oils, lipids, and fatty acid esters, or wherein the amphiphilic component is selected from the group consisting of sorbitol esters, polysorbates, sodium dodecyl sulfate (SDS), sodium sulfate (SOS), sodium tetradecyl sulfate (STS), and fatty acids.

8. The composite as claimed in claim 1, wherein the composite has a moisture content in the range of 2-30% by weight, and a moisture free content or dry solids in the range of 70-98% by weight.

9. The composite as claimed in claim 1, wherein the composite is in the form selected from the group consisting of dry granules, wet pulps, dry powder, dry flakes, capsules, wet pastes, and a mixture thereof, and wherein the composite is biodegradable.

10. A composite, consisting of:
  a) seaweed, a seaweed extract, or a combination thereof in a weight percentage of at least 15% with respect to the composite on a moisture-free basis;

b) an organic ammonium salt selected from the group consisting of a primary, secondary, and tertiary ammonium salt, wherein the organic ammonium salt has a weight percentage in the range of 1-45% with respect to the composite on a moisture-free basis, and the organic ammonium salt is selected from the group consisting of ammonium salt of tris(hydroxymethyl) aminomethane (TRIS), ammonium salt of alkylamines, ammonium salt of dialkylamines, ammonium salt of glutamine, ammonium salt of asparagine, ammonium salt of arginine, ammonium salt of lysine, ammonium salt of histidine, ammonium salt of polylysine, ammonium salt of polyarginine, ammonium salt of polyhistidine, ammonium salt of polyethylenimine, ammonium salt of polyethylamine, derivatives thereof, and combinations thereof; and c) an oleophilic component or an amphiphilic component wherein the organic ammonium salt forms ionic, covalent and/or coordinate covalent interactions with the seaweed or seaweed extract forming a complex.

11. The composite as claimed in claim 10, wherein the seaweed or seaweed extract is selected from the group consisting of *Kappaphycus striatus, Eucheuma cottonii, Eucheuma denticulatum, Halymenia durvillaea, Kappaphycus alvarezii, Chondrus crispus, Porphyra purpurea, Eucheuma isiforme, Hypnea musciformis, Solieria filiformis, Mastocarpus stellatus, Porphyra capensis, Gracilaria* sp., *Gigartina skottsbergii, Gelidium amansii, Gracilaria dura, Gracilaria gigas, Furcellaria* sp., *Sargassum* sp., *Ascophyllum* sp., *Kelp, Saccharina* sp., *Laminaria* sp., *Asparagopsis* sp., *Ulva* sp., kappa-carrageenan, iota-carrageenan, lambda-carrageenan, alginate, agar, and ulvan.

12. The composite as claimed in claim 10, wherein the oleophilic component is selected from the group consisting of vegetable oils, palm oil, essential oils, lipids, and fatty acid esters, or wherein the amphiphilic component is selected from the group consisting of sorbitol esters, polysorbates, sodium dodecyl sulfate (SDS), sodium sulfate (SOS), sodium tetradecyl sulfate (STS), and fatty acids.

13. A composite, comprising:
a) seaweed or seaweed extract in a weight percentage of at least 15% with respect to the composite on a moisture-free basis; and
b) at least one organic ammonium salt selected from the group consisting of a primary, secondary, and tertiary ammonium salt, wherein the organic ammonium salt has a weight percentage in the range of 1-6.0% with respect to the composite on a moisture-free basis, and the organic ammonium salt is selected from the group consisting of: ammonium salt of dialkylamines, ammonium salt of glutamine, ammonium salt of asparagine, ammonium salt of arginine, ammonium salt of lysine, ammonium salt of histidine, ammonium salt of polylysine, ammonium salt of polyarginine, ammonium salt of polyhistidine, ammonium salt of polyethylenimine, ammonium salt of polyethylamine, derivatives thereof, and combinations thereof;
wherein, said composite does not comprise urea and wherein the organic ammonium salt forms ionic, covalent and/or coordinate covalent interactions with the seaweed or seaweed extract forming a complex.

14. An article comprising the composite as claimed in claim 1, wherein the composite is in the form selected from the group consisting of dry granules, wet pulps, dry powder, dry flakes, capsules, wet pastes, and a mixture thereof, and wherein the composite is biodegradable.

15. The article as claimed in claim 14, wherein said article is selected from the group consisting of films, bioplastic films, thermoformed inserts, sheets, sachets for both dry and wet materials, laminates, banners, loose fill for packaging, secondary packaging, bubble wrap, coatings, inner lining for cardboard boxes, multilayer films with at least one of the layers comprising the composite, blister packs, boxes, waste collection bags, shopping bags, bottles, trays, cups, lids, nettings, tubs for produce, pouches, jars, tunes, teabags, capsules, plates, straws, spoons, forks, food wraps, agricultural mulch films, plant pots, seed strips, twine, ties, clips, tapes, thread, gloves, masks, gowns, plastic replacement for electronics, automobile, aerospace, houseware, textiles, and mixtures thereof.

16. The article as claimed in claim 14, wherein the article is obtained by a process comprising the steps of:
(a) providing at least one seaweed or seaweed extract;
(b) contacting the seaweed or seaweed extract with at least one solvent;
(c) heating the seaweed or seaweed extract in the solvent to obtain a preheated mixture;
(d) contacting the preheated mixture and at least one organic ammonium salt, and optionally at least one component selected from the group consisting of an oleophilic component and an amphiphilic component, to obtain a first mixture;
(e) transferring the first mixture into a mold or an extruder to obtain a molded composite; and
(e) evaporating the solvent from the molded composite to obtain the article.

17. The article as claimed in claim 14, wherein the article further comprises at least one additive selected from the group consisting of plant fiber, natural fiber, gum, synthetic fiber, and mixtures thereof;
wherein the plant fiber is selected from the group consisting of jute, cotton, flax fiber linen, paper, wood pulp, bagasse, cardboard waste, natural rubber, celluloses, starches, and mixtures thereof;
wherein the natural fiber is selected from the group consisting of silk, wool milk proteins, egg proteins, vegetable proteins, chitin, chitosan, collagen, hyaluronic acid, xyloglucan, curdlan, dextran, arabinoxylans, polyhydroxybutyrate, polyhydroxyalkanoates, beta-glucans, inulin, agricultural waste, food waste, vegetable waste, and mixtures thereof; wherein the gum is selected from the group consisting of gelatin, guar gum, karaya gum, gum tragacanth pectin, locust bean gum, pullulan, xanthan gum, gellan gum, galactomannan gum, gum arabic, gum acacia, gum ghatti, konjac glucomannan, and mixtures thereof; and wherein the synthetic fiber is selected from the group consisting of polylactic acid, polyvinyl alcohol, polybutylene succinate, polycaprolactone, and polybutylene adipate terephthalate, and mixtures thereof.

18. A process for preparing the composite as claimed in claim 1, said process comprising:
(a) providing said at least one seaweed or seaweed extract;
(b) contacting the seaweed or seaweed extract with at least one solvent;
(c) heating the seaweed or seaweed extract in the solvent to obtain a preheated mixture;
(d) contacting the preheated mixture and said at least one organic ammonium salt, and optionally at least one component selected from the group consisting of an oleophilic component and an amphiphilic component, to obtain a first mixture; and (e) evaporating the solvent from the first mixture to obtain the composite, wherein the composite is in the form selected from the group consisting of dry granules, wet pulps, dry powder, dry flakes, capsules, wet pastes, and mixtures thereof, wherein the composite is biodegradable and does not comprise urea.

19. The process as claimed in claim 18, wherein contacting and heating the seaweed or extract in the solvent is done at a temperature in the range of 70-90° C. to obtain the preheated mixture, and wherein contacting the preheated mixture and the organic ammonium salt is done at a temperature in the range of 70-90° C. for a time in the range of 15-60 minutes to obtain the first mixture.

20. The process as claimed in claim 18, wherein the solvent is selected from the group consisting of water, acetone, methanol, ethanol, isopropyl alcohol, butanol, acetonitrile, ethyl acetate, dimethyl sulfoxide, chloroform, dichloromethane, and combinations thereof.

21. The process as claimed in claim 18, wherein the contacting of the preheated mixture and the organic ammonium salt, and optionally at least one component selected from the group consisting of an oleophilic component and an amphiphilic component, is done at a temperature in the range of 70-130° C. for a time in the range of 15-120 minutes to obtain the first mixture.

\* \* \* \* \*